United States Patent
Shin et al.

(10) Patent No.: US 10,410,599 B2
(45) Date of Patent: Sep. 10, 2019

(54) SOURCE DRIVER INTEGRATED CIRCUIT FOR OMPENSATING FOR DISPLAY FAN-OUT AND DISPLAY SYSTEM INCLUDING THE SAME

(71) Applicant: SAMSUNG ELECTRONICS CO., LTD., Suwon-si (KR)

(72) Inventors: Ha Joon Shin, Hwaseong-si (KR); Jin-Soo Kim, Seoul (KR); Seung Hwan Baek, Hwaseong-si (KR); Kyung-Gyu Park, Suwon-si (KR); Ji-Yong Jeong, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 167 days.

(21) Appl. No.: 15/235,576

(22) Filed: Aug. 12, 2016

(65) Prior Publication Data
US 2017/0047001 A1 Feb. 16, 2017

(30) Foreign Application Priority Data

Aug. 13, 2015 (KR) .................. 10-2015-0114534
Apr. 11, 2016 (KR) .................. 10-2016-0043940

(51) Int. Cl.
*G06F 3/14* (2006.01)
*G09G 3/36* (2006.01)
*G09G 3/3275* (2016.01)

(52) U.S. Cl.
CPC ......... *G09G 3/3688* (2013.01); *G06F 3/1446* (2013.01); *G09G 3/3275* (2013.01); *G09G 2230/00* (2013.01); *G09G 2300/026* (2013.01); *G09G 2310/0291* (2013.01); *G09G 2310/08* (2013.01)

(58) Field of Classification Search
CPC ... G09G 2310/0264; G09G 2320/0223; G09G 3/3685; G09G 3/3688; G09G 3/3696
See application file for complete search history.

(56) References Cited

U.S. PATENT DOCUMENTS

| 5,947,022 | A | * | 9/1999 | Freeman | ............... | B23K 3/0607 |
|---|---|---|---|---|---|---|
| | | | | | | 101/123 |
| 6,947,022 | B2 | | 9/2005 | McCartney | | |
| 7,239,300 | B2 | * | 7/2007 | Shimizu | ............... | G09G 3/3688 |
| | | | | | | 345/100 |

(Continued)

FOREIGN PATENT DOCUMENTS

| JP | 2008-165223 A | 7/2008 |
|---|---|---|
| KR | 10-2015-0003054 A | 1/2015 |

(Continued)

*Primary Examiner* — Patrick F Marinelli
(74) *Attorney, Agent, or Firm* — Sughrue Mion, PLLC

(57) ABSTRACT

A source driver integrated circuit (IC) for driving a flat panel display is provided. The source driver IC includes a first control logic circuit configured to generate first output signals for driving first source lines arranged in a first region of the flat panel display and a second control logic circuit configured to generate second output signals for driving second source lines arranged in a second region of the flat panel display. A first output delay between two adjacent output signals among the first output signals is different from a second output delay between two adjacent output signals among the second output signals.

21 Claims, 23 Drawing Sheets

(56) References Cited

U.S. PATENT DOCUMENTS

| | | | | |
|---|---|---|---|---|
| 7,821,487 B2* | 10/2010 | Tanaka | G09G 3/3688 | 345/100 |
| 8,134,525 B2* | 3/2012 | Yang | G09G 3/3648 | 345/100 |
| 8,232,941 B2* | 7/2012 | Yeo | G09G 3/3677 | 345/100 |
| 8,362,997 B2* | 1/2013 | Huang | G09G 3/20 | 345/213 |
| 8,456,407 B2* | 6/2013 | Weng | G09G 3/3688 | 315/98 |
| 8,493,373 B2* | 7/2013 | Jeon | G09G 3/20 | 345/100 |
| 8,624,817 B2* | 1/2014 | Kim | G09G 3/20 | 345/99 |
| 8,754,883 B2* | 6/2014 | Su | G09G 3/3648 | 345/213 |
| 8,929,506 B2* | 1/2015 | Ma | G11C 19/28 | 377/64 |
| 9,251,757 B2* | 2/2016 | Suzuki | G09G 3/3688 | |
| 9,489,901 B2* | 11/2016 | Nakai | G09G 3/36 | |
| 9,542,902 B2* | 1/2017 | Ishii | G09G 3/3696 | |
| 9,633,592 B2 | 4/2017 | Kumeta | G09G 3/2003 | |
| 9,633,595 B2 | 4/2017 | Hwang | G09G 3/2092 | |
| 2003/0160753 A1* | 8/2003 | McCartney | G09G 3/3611 | 345/99 |
| 2007/0152947 A1* | 7/2007 | Tanaka | G09G 3/3688 | 345/100 |
| 2008/0174539 A1* | 7/2008 | Hu | G09G 3/2096 | 345/99 |
| 2009/0058838 A1* | 3/2009 | Lee | G09G 3/3688 | 345/204 |
| 2010/0060557 A1* | 3/2010 | Hsu | G09G 3/3688 | 345/87 |
| 2010/0302214 A1* | 12/2010 | Kim | G09G 3/20 | 345/204 |
| 2011/0316821 A1* | 12/2011 | Suzuki | G09G 3/3688 | 345/204 |
| 2013/0050161 A1* | 2/2013 | Park | G09G 3/3266 | 345/204 |
| 2013/0120344 A1* | 5/2013 | Liao | G09G 5/00 | 345/212 |
| 2013/0278572 A1* | 10/2013 | Lee | G09G 3/3677 | 345/204 |
| 2014/0232713 A1* | 8/2014 | Hsu | G09G 3/3685 | 345/213 |
| 2014/0313185 A1* | 10/2014 | Li | G09G 3/20 | 345/214 |
| 2015/0008963 A1* | 1/2015 | Song | H03K 19/00361 | 327/108 |
| 2015/0040976 A1* | 2/2015 | Agarkar | H01G 9/2031 | 136/256 |
| 2015/0049076 A1* | 2/2015 | Kim | G09G 3/20 | 345/212 |
| 2015/0097871 A1* | 4/2015 | Kumeta | G09G 3/2003 | 345/690 |
| 2015/0109357 A1* | 4/2015 | Nakai | G09G 3/36 | 345/691 |
| 2015/0145852 A1* | 5/2015 | Ahn | G09G 3/3677 | 345/214 |
| 2015/0187294 A1* | 7/2015 | Chen | G09G 3/3685 | 345/205 |
| 2015/0221274 A1* | 8/2015 | Ishii | G09G 3/3677 | 345/690 |
| 2015/0221276 A1* | 8/2015 | Ishii | G09G 3/3696 | 345/690 |
| 2015/0255035 A1* | 9/2015 | Takahashi | G09G 3/3696 | 345/690 |
| 2015/0302816 A1* | 10/2015 | Won | G09G 3/3685 | 345/87 |
| 2015/0356925 A1* | 12/2015 | Lee | G09G 3/3266 | 345/212 |
| 2016/0019846 A1* | 1/2016 | Kim | G09G 3/3406 | 345/690 |
| 2016/0093237 A1* | 3/2016 | Lee | G09G 3/3688 | 345/690 |
| 2016/0111051 A1* | 4/2016 | Jeon | G09G 3/3674 | 345/204 |
| 2016/0118006 A1* | 4/2016 | Park | G09G 3/3666 | 345/690 |
| 2016/0196799 A1* | 7/2016 | Ahn | G09G 3/3648 | 345/213 |
| 2016/0203753 A1* | 7/2016 | Hwang | G09G 3/2092 | 345/212 |
| 2016/0358576 A1* | 12/2016 | Lee | G09G 3/3685 | |
| 2016/0365046 A1* | 12/2016 | Chen | G02F 1/1362 | |
| 2017/0047001 A1* | 2/2017 | Shin | G06F 3/1446 | |
| 2017/0047016 A1* | 2/2017 | Son | G09G 3/20 | |

FOREIGN PATENT DOCUMENTS

| KR | 10-2015-0005299 A | 1/2015 |
|---|---|---|
| KR | 10-2015-0026057 A | 3/2015 |
| KR | 10-1497250 B1 | 3/2015 |

* cited by examiner

FIG. 15
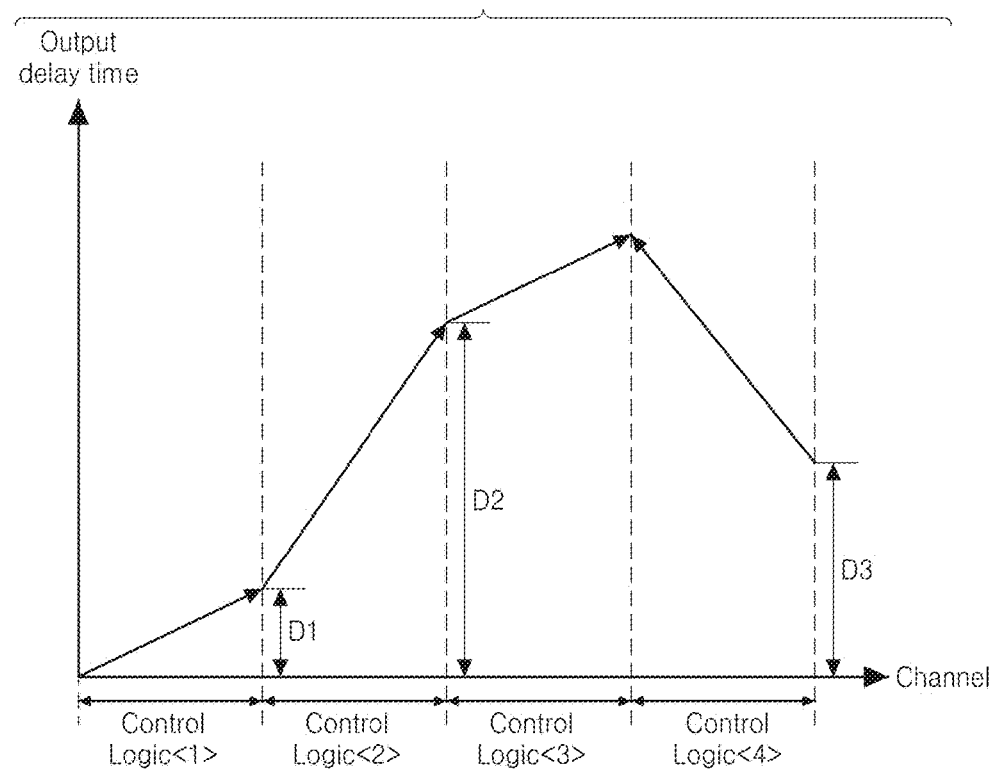
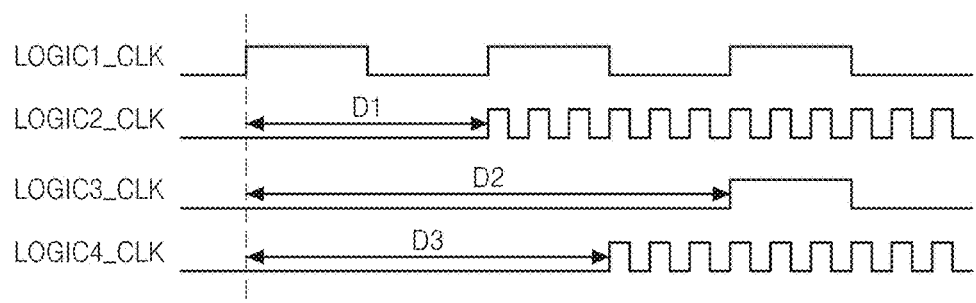

SOURCE DRIVER INTEGRATED CIRCUIT FOR OMPENSATING FOR DISPLAY FAN-OUT AND DISPLAY SYSTEM INCLUDING THE SAME

CROSS-REFERENCE TO RELATED APPLICATIONS

This application claims priority under 35 U.S.C. § 119 to Korean Patent Application Nos. 10-2015-0114534, filed Aug. 13, 2015, and 10-2016-0043940, filed Apr. 11, 2016 in the Korean Intellectual Property Office (KIPO), the entire contents of which are incorporated herein by reference.

BACKGROUND

Exemplary embodiments of the inventive concept relate to a source driver integrated circuit (IC), and more particularly, to a source driver IC for compensating for the fan-out of a display panel and partially controlling an output delay time and a display system including the same.

As the size of a display panel included in a display device increases, resistor-capacitor (RC) delay of a gate line included in the display panel also increases. As the scan rate and the resolution of the display panel increase, a timing margin between a gate signal transmitted through a gate line included in the display panel and a data signal transmitted through a source line (or a data line) included in the display panel decreases.

The size of a printed circuit board (PCB) connected to a plurality of source driver ICs which drive pixels arranged in a display panel, is on a shrinking trend for cost reduction. Accordingly, the fan-out of the display panel driven by the source driver ICs may be different or asymmetric among the source driver ICs. The fan-out of the display panel driven by the source driver ICs increases with the increase in the size of the display panel. However, a conventional source driver IC does not accurately compensate for the fan-out of the display panel.

SUMMARY

According to some exemplary embodiments, there is an integrated circuit (IC) for driving a panel display, the IC including: a first circuit configured to generate first output signals for driving first lines in a first region of the panel display; and a second circuit configured to generate second output signals for driving second lines in a second region of the panel display, wherein a first output delay is a delay between two adjacent output signals among the first output signals, a second output delay is a delay between two adjacent output signals among the second output signals, and the first and the second output delays are different.

In another exemplary embodiment, there is an integrated circuit (IC) for driving a panel display, wherein the IC is configured to: generate first output signals for driving a first source line and a second source line which is adjacent to the first source line, among source lines in the panel display and generate second output signals for driving a third source line and a fourth source line which is adjacent to the third source line, among the source lines in the panel display, wherein a first output delay is a delay between the first output signals, a second output delay is a delay between the second output signals, and the first and the second output delays are different.

In yet another exemplary embodiment, there is a display system including: a flat panel display including a first region and a second region; and a source driver integrated circuit (IC) configured to drive first source lines arranged in the first region and second source lines arranged in the second region, wherein the source driver IC includes: a first control logic circuit configured to generate first output signals for driving the first source lines; and a second control logic circuit configured to generate second output signals for driving the second source lines, wherein a first output delay is a delay between two adjacent output signals among the first output signals, a second output delay is a delay between two adjacent output signals among the second output signals, and the first and the second output delays are different.

In one exemplary embodiment, there is a display system including: a flat panel display including a first region and a second region; and a source driver integrated circuit (IC) configured to drive first source lines arranged in the first region and second source lines arranged in the second region, wherein the source driver IC includes: a first control logic circuit configured to generate first output signals for driving the first source lines; and a second control logic circuit configured to generate second output signals for driving the second source lines, wherein a first output delay is a delay between two adjacent output signals among the first output signals, a second output delay is a delay between two adjacent output signals among the second output signals, and the first and the second output delays are different.

BRIEF DESCRIPTION OF THE DRAWINGS

The above and other features and advantages of the inventive concept will become more apparent by describing in detail exemplary embodiments thereof with reference to the attached drawings in which:

FIG. 15 is a diagram illustrating the start delay and the output delay time of each of source driver ICs according to some exemplary embodiments of the inventive concept;

DETAILED DESCRIPTION OF THE EXEMPLARY EMBODIMENTS

Figure 1:
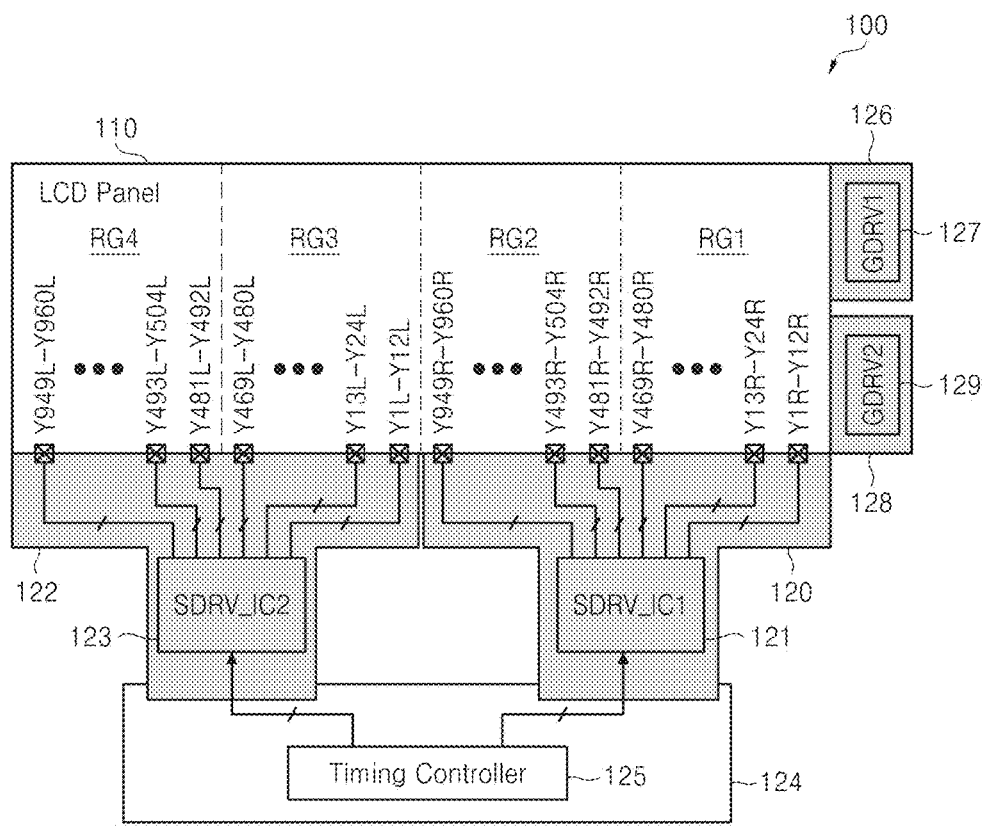
FIG. 1 is a block diagram of a display system including source driver integrated circuits (ICs) according to some exemplary embodiments of the inventive concept.

The inventive concept now will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

As is traditional in the field of the inventive concepts, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a block diagram of a display system 100 including an integrated circuit, e.g., source driver integrated circuits (ICs) 121 and 123, according to some exemplary embodiments of the inventive concept.

The display system 100 may include a panel display, e.g., a flat panel display 110, a plurality of the source driver ICs 121 and 123, a timing controller 125, and a plurality of gate driver ICs 127 and 129. The display system 100 may be implemented as or in a personal computer (PC), a digital television (TV), an internet protocol (IP) TV, or a mobile device. The flat panel display 110 may be a thin-film transistor liquid crystal display (TFT-LCD) panel, a light emitting diode (LED) panel, an organic LED (OLED) panel, or an active-matrix OLED (AMOLED) panel but is not restricted thereto. Although a TFT-LCD panel is illustrated as the flat panel display 110 in FIG. 1, the inventive concept is not restricted to the current exemplary embodiments to the TFT-LCD panel.

The flat panel display 110 may include a plurality of source lines, a plurality of gate lines, and a plurality of pixels. Each of the pixels may be connected to one of the source lines and one of the gate lines.

The source driver ICs 121 and 123 may be connected to flexible printed circuits (FPCs) 120 and 122, respectively. In one exemplary embodiment, the FPCs 120 and 122 are on separate substrates and in another exemplary embodiment, the FPCs 120 and 122 are on the same common substrate. The FPCs 120 and 122 may be connected to a source driver printed circuit board (PCB) 124 and the flat panel display 110. The timing controller 125 may be mounted on the source driver PCB 124. The timing controller 125 may generate control signals for controlling the source driver ICs 121 and 123. Each of the source driver ICs 121 and 123 may drive respectively allocated source lines among the source lines included in the flat panel display 110, in response to the control signals.

The gate driver ICs 127 and 129 may be connected to FPCs 126 and 128, respectively. The FPCs 126 and 128 may be connected to a gate driver PCB (not shown) and the flat panel display 110. Each of the elements 120, 122, 126, and 128 may be a chip-on-film (COF) or a COF package but is not restricted thereto.

The source driver ICs 121 and 123 may drive source lines arranged in the flat panel display 110 based on the control of the timing controller 125. The gate driver ICs 127 and 129 may drive gate lines arranged in the flat panel display 110 based on the control of a controller included in the gate driver PCB. In other words, the pixels in the flat panel display 110 may display an image or data based on the control of the source driver ICs 121 and 123 and the gate driver ICs 127 and 129. Although two source driver ICs 121 and 123 and two gate driver ICs 127 and 129 are illustrated in FIG. 1, the numbers of source driver ICs and gate driver ICs included in the display system 100 may be variously changed in different exemplary embodiments. Furthermore, in one alternative embodiment, there is a single source driver IC which drives all the source lines driven by the two source driver ICs 121 and 123 in other exemplary embodiments. Similarly, in another exemplary embodiment, there is a single gate driver IC which drives all the gates lines driven by the two gate driver ICs 127 and 129 in other exemplary embodiments The first source driver IC 121 may control source lines Y1R through Y960R included in two regions RG1 and RG2 of the flat panel display 110 and the second source driver IC 123 may control source lines Y1L through Y960L included in two regions RG3 and RG4 of the flat panel display 110. The source driver ICs 121 and 123 may generate enable signals (or output signals) having different output delays (or output delay times) based on the position of a channel or the position of a channel group. Accordingly, the source driver ICs 121 and 123 may compensate for the fan-out of the flat panel display 110 and the RC delay of the gate lines. Even when the flat panel display 110 has a large gate line delay and a high scan rate, the source driver ICs 121 and 123 may generate output signals having effective output characteristics.

A channel may refer to a source line (or a data line) transmitting data. A channel group may include at least two channels. The source driver ICs 121 and 123 may control output delay or latency differently for each channel or each channel group.

The first source driver IC 121 may control various delays so that the delays are different, e.g., control a first delay between a first channel and a second channel to be different from a second delay between the second channel and a third channel and may control the second delay to be different from a third delay between the third channel and a fourth channel. Alternatively, the first source driver IC 121 may control a first delay between a first channel group and a second channel group to be different from a second delay between the second channel group and a third channel group and may control the second delay to be different from a third delay between the third channel group and a fourth channel group, but the first source driver IC 121 may control a delay between adjacent two channels in a channel group to be the same as a delay between adjacent two other channels in the same channel group.

Figure 2:
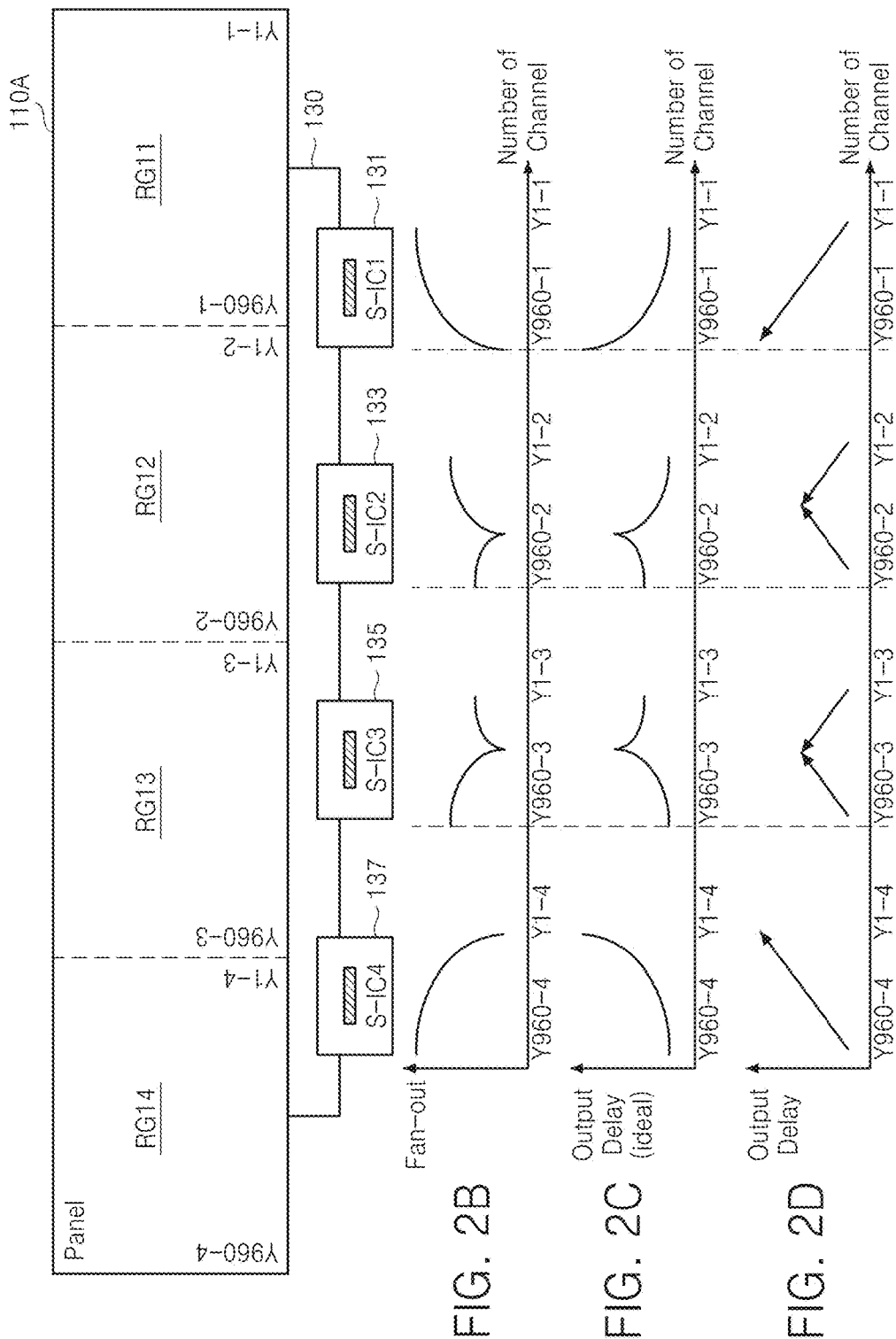
FIGS. 2A through 2D are conceptual diagrams for explaining the fan-out and the output delay of each of conventional source driver ICs.

FIGS. 2A through 2D are conceptual diagrams for explaining the fan-out and the output delay of each of conventional source driver ICs S-IC1 through S-IC4. Referring to FIG. 2A, a flat panel display 110A includes four regions RG11 through RG14, the conventional source driver IC S-IC1 included in an FPC 131 controls source lines Y1-1 through Y960-1 included in the first region RG11, the conventional source driver IC S-IC2 included in an FPC 133 controls source lines Y1-2 through Y960-2 included in the second region RG12, the conventional source driver IC S-IC3 included in an FPC 135 controls source lines Y1-3 through Y960-3 included in the third region RG13, and the conventional source driver IC S-IC4 included in an FPC 137 controls source lines Y1-4 through Y960-4 included in the fourth region RG14. The FPC 131, 133, 135, and 137 are connected to the flat panel display 110A through a connecting portion 130.

Referring to FIG. 2A, the positions of the respective source driver ICs S-IC1 through S-IC4 with respect to the regions RG11 through RG14, respectively, are different. For instance, the source driver IC S-IC1 is positioned on the left of the center of the first region RG11, the source driver IC S-IC2 is positioned on the left of the center of the second region RG12, the source driver IC S-IC3 is positioned on the right of the center of the third region RG13, and the source driver IC S-IC4 is positioned on the right of the center of the fourth region RG14. In addition, the source driver IC S-IC1 occupies a more leftward position than the source driver IC S-IC2 and the source driver IC S-IC4 occupies a more rightward position than the source driver IC S-IC3.

FIG. 2B shows a fan-out with respect to the position of each of the source driver ICs S-IC1 through S-IC4. FIG. 2C shows an ideal output delay with respect to the position of each of the source driver ICs S-IC1 through S-IC4. FIG. 2D shows an actual output delay with respect to the position of each of the source driver ICs S-IC1 through S-IC4. Referring to FIG. 2D, the actual output delay does not reflect the position of each channel.

Figure 3:
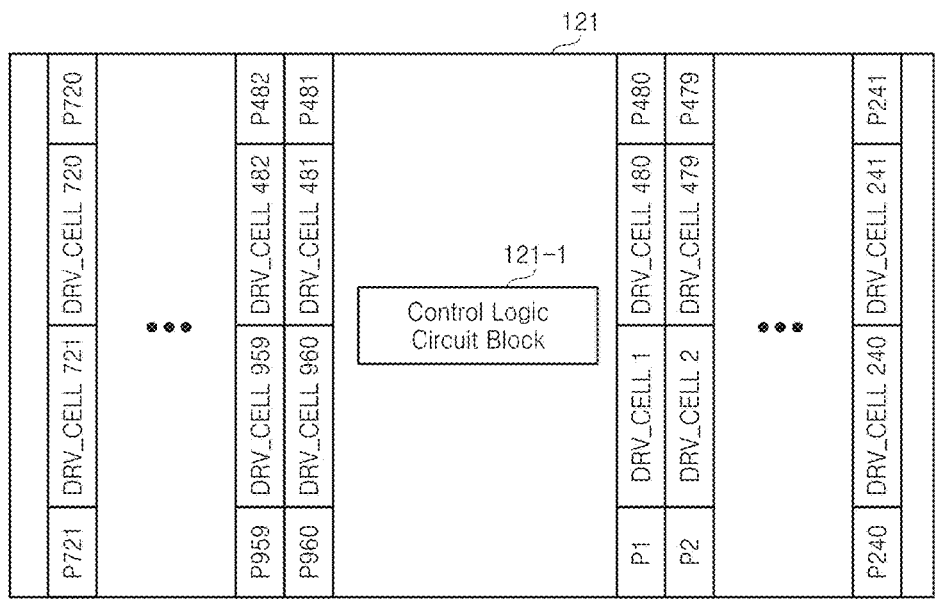
FIG. 3 is a schematic block diagram of a source driver IC illustrated in FIG. 1.

FIG. 3 is a schematic block diagram of the first source driver IC 121 illustrated in FIG. 1. The structure of the first source driver IC 121 is the same as or similar to that of the second source driver IC 122.

Referring to FIG. 3, the first source driver IC 121 may include a first circuit, e.g., a control logic circuit block 121-1, which generates enable signals, a plurality of driver cells DRV_CELL1 through DRV_CELL960, and a plurality of pads P1 through P960. Each of the pads P1 through P960 may be a pin. The internal structure of the first source driver IC 121 illustrated in FIG. 3 is provided for the description and may be changed variously in other exemplary embodiments. The driver cells DRV_CELL1 through DRV_CELL960 may have the same structures as or similar structures to one another. The pads P1 through P960 may be connected to the source lines Y1R through Y960R, respectively, through metal lines arranged in the FPC 120.

Figure 4:
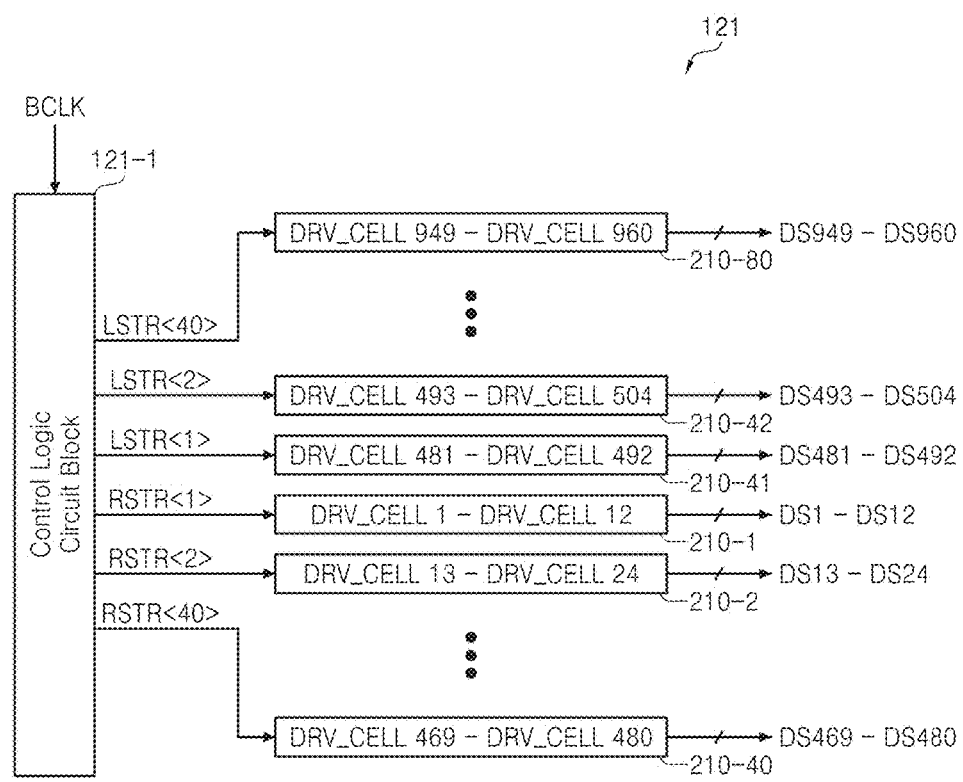
FIG. 4 is a detailed block diagram of the source driver IC illustrated in FIG. 1.

FIG. 4 is a detailed block diagram of the first source driver IC 121 illustrated in FIG. 1. Referring to FIGS. 1, 3, and 4, it is assumed that the first source driver IC 121 drives 960 source lines Y1R through Y960R included in the two regions RG1 and RG2, 480 source lines Y1R through Y480R included in the first region RG1 are controlled by 40 right enable signals RSTR<1> through RSTR<40>, and each of the right enable signals RSTR<1> through RSTR<40> controls the output delay of twelve driver cells. It is also assumed that 480 source lines Y481R through Y960R included in the second region RG2 are controlled by 40 left enable signals LSTR<1> through LSTR<40>, and each of the left enable signals LSTR<1> through LSTR<40> controls the output delay of twelve driver cells.

For instance, enabling or disabling of a first driver cell block 210-1 including twelve driver cells DRV_CELL1 through DRV_CELL12 may be controlled by the first right enable signal RSTR<1>. When the first driver cell block 210-1 is enabled by the first right enable signal RSTR<1>, twelve output signals DS1 through DS12 may be transmitted to twelve source lines Y1R through Y12R at the same time or in parallel. Output signals DS1 through DS960 may refer to driving signals which respectively drive the source lines Y1R through Y960R.

Enabling or disabling of a second driver cell block 210-2 including twelve driver cells DRV_CELL13 through DRV_CELL24 may be controlled by the second right enable signal RSTR<2>. When the second driver cell block 210-2 is enabled, twelve output signals DS13 through DS24 may be transmitted to twelve source lines Y13R through Y24R at the same time or in parallel.

Enabling or disabling of a 40th driver cell block 210-40 including twelve driver cells DRV_CELL469 through DRV_CELL480 may be controlled by the 40th right enable signal RSTR<40>. When the 40th driver cell block 210-40 is enabled, twelve output signals DS469 through DS480 may be transmitted to twelve source lines Y469R through Y480R at the same time or in parallel.

Enabling or disabling of a 41st driver cell block 210-41 including twelve driver cells DRV_CELL481 through DRV_CELL492 may be controlled by the first left enable signal LSTR<1>. When the 41st driver cell block 210-41 is enabled by the first left enable signal LSTR<1>, twelve output signals DS481 through DS492 may be transmitted to twelve source lines Y481R through Y492R at the same time or in parallel.

Enabling or disabling of a 42nd driver cell block 210-42 including twelve driver cells DRV_CELL493 through DRV_CELL504 may be controlled by the second left enable signal LSTR<2>. When the 42nd driver cell block 210-42 is enabled, twelve output signals DS493 through DS504 may be transmitted to twelve source lines Y493R through Y504R at the same time or in parallel.

Enabling or disabling of an 80th driver cell block 210-80 including twelve driver cells DRV_CELL949 through DRV_CELL960 may be controlled by the 40th left enable signal LSTR<40>. When the 80th driver cell block 210-80 is enabled, twelve output signals DS949 through DS960 may be transmitted to twelve source lines Y949R through Y960R at the same time or in parallel.

The control logic circuit block 121-1 may control the generation timings and/or directions of the enable signals RSTR<1> through RSTR<40> and LSTR<1> through LSTR<40> in response to a base clock BCLK and control signals. For instance, the enable signals RSTR<1> through RSTR<20> having the timing illustrated in FIG. 9 may be defined as enable signals having a first direction and the enable signals LSTR<21> through LSTR<40> having the timing illustrated in FIG. 11 may be defined as enable signals having a second direction.

Figure 5:
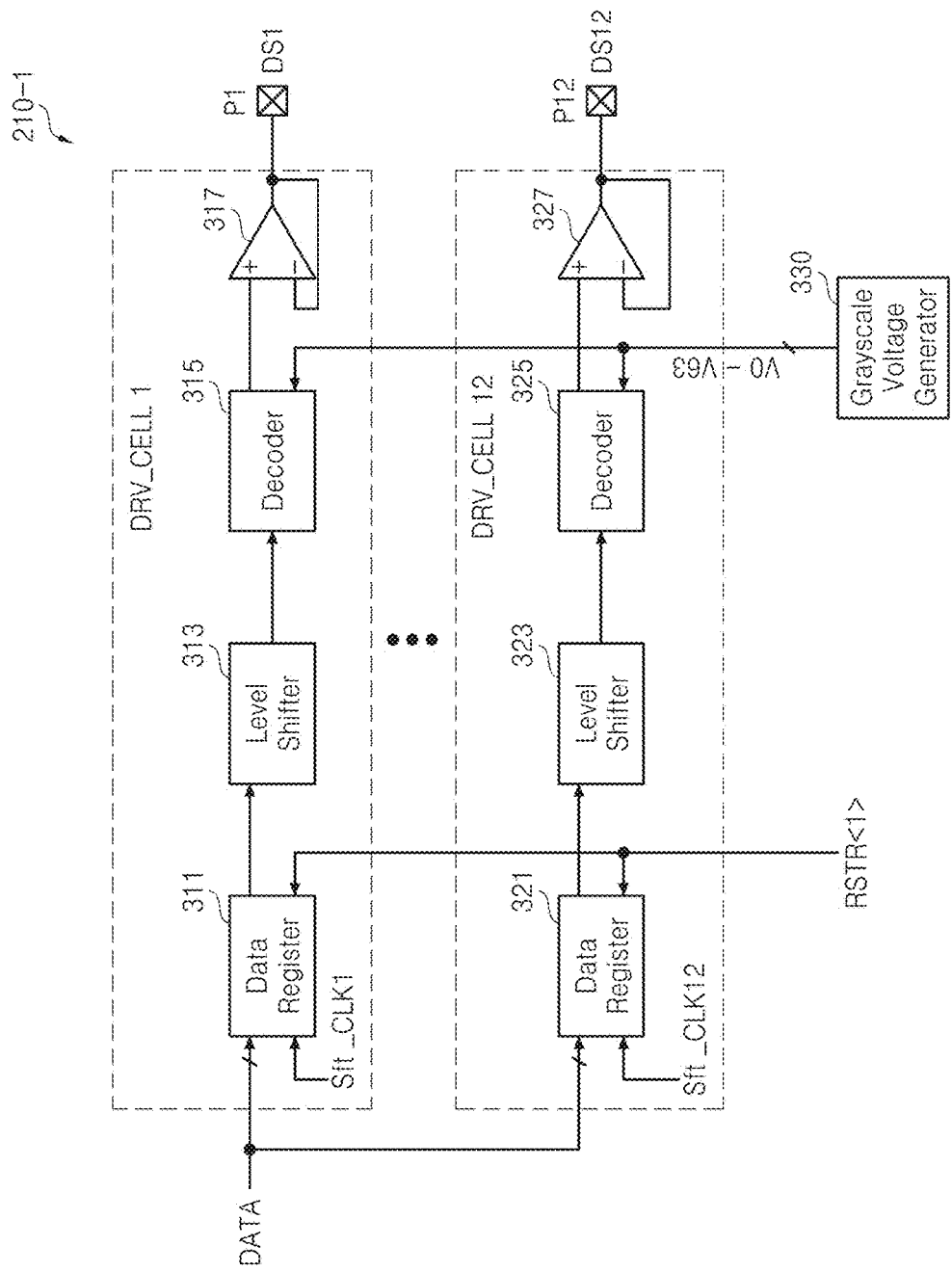
FIG. 5 is a circuit diagram of a first driver cell block illustrated in FIG. 4.

FIG. 5 is a circuit diagram of the first driver cell block 210-1 illustrated in FIG. 4. The structure and operations of the driver cell blocks 210-1 through 210-80 may be the same or similar among the driver cell blocks 210-1 through 210-80. Referring to FIGS. 4 and 5, the first driver cell block 210-1 may include the twelve driver cells DRV_CELL1 through DRV_CELL12. Each of the driver cells DRV_CELL1 through DRV_CELL12 may include a data register, a level shifter, a decoder, and an output buffer.

The first driver cell DRV_CELL1 may include a data register 311, a level shifter 313, a decoder 315, and an output buffer 317. The data register 311 may latch data DATA in response to a first shift clock Sft_CLK1 and may transmit latched data to the level shifter 313 in response to the first right enable signal RSTR<1>. The level shifter 313 may shift the level of the data output from the data register 311 and may output level-shifted data to the decoder 315. The decoder 315 may select one of grayscale voltages V0 through V63 based on the level-shifted data and may output a selected voltage to the output buffer 317. The output buffer 317 may buffer the voltage (e.g., analog voltage) selected by the decoder 315 and may send the buffered voltage DS1 to the first source line Y1R through the first output pad P1.

The twelfth driver cell DRV_CELL12 may send the buffered voltage DS12 to the twelfth source line Y12R through the twelfth output pad P12 simultaneously or in parallel with the operation of the first driver cell DRV_CELL1. A data register 321 may latch the data DATA in response to a twelfth shift clock Sft_CLK12 and may transmit latched data to a level shifter 323 in response to the first right enable signal RSTR<1>. The level shifter 323 may shift the level of the data output from the data register 321 and may output level-shifted data to a decoder 325. The decoder 325 may select one of the grayscale voltages V0 through V63 based on the level-shifted data and may output a selected voltage to an output buffer 327. The output buffer 327 may buffer the voltage (e.g., analog voltage) selected by the decoder 325 and may send the buffered voltage DS12 to the twelfth source line Y12R through the twelfth output pad P12. The grayscale voltages V0 through V63 may be generated by a grayscale voltage generator 330.

Figure 6:
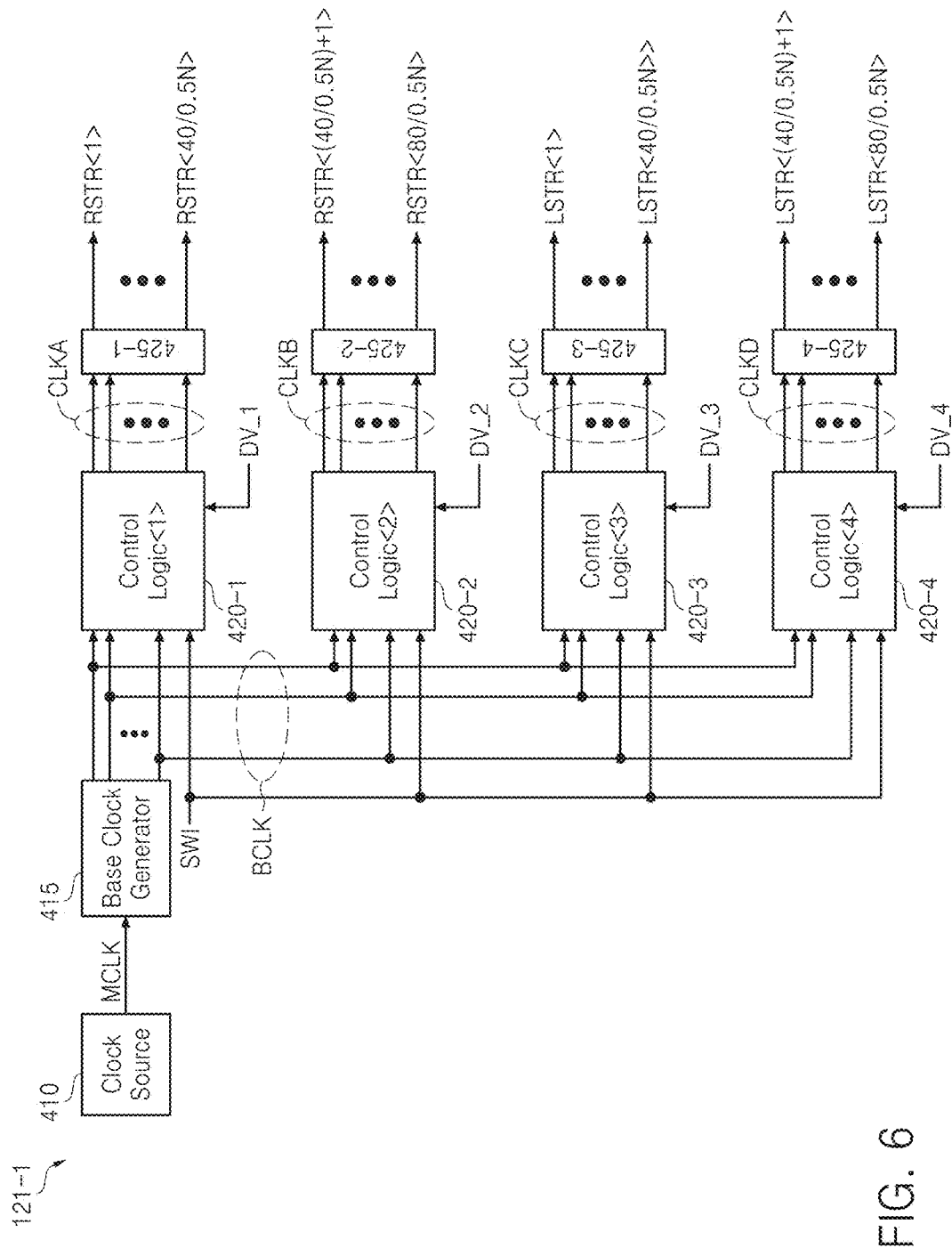
FIG. 6 is a block diagram of a control logic circuit block illustrated in FIG. 4 according to some exemplary embodiments of the inventive concept.

FIG. 6 is a block diagram of the control logic circuit block 121-1 illustrated in FIG. 4 according to some exemplary embodiments of the inventive concept. Referring to FIGS. 1, 4, and 6, the control logic circuit block 121-1 may include a clock source 410, a base clock generator 415, a plurality of control logics 420-1 through 420-4, and a plurality of enable signal generators 425-1 through 425-4. In other embodiments, the enable signal generators 425-1 through 425-4 may be included in the control logics 420-1 through 420-4, respectively. It is assumed that the first source driver IC 121 includes four control logics 420-1 through 420-4 and four enable signal generators 425-1 through 425-4. The numbers of control logics and enable signal generators may be changed in other exemplary embodiments.

The clock source 410 may generate a source clock MCLK. The base clock generator 415 may generate a plurality of base clocks BCLK using the source clock MCLK.

Figure 7:
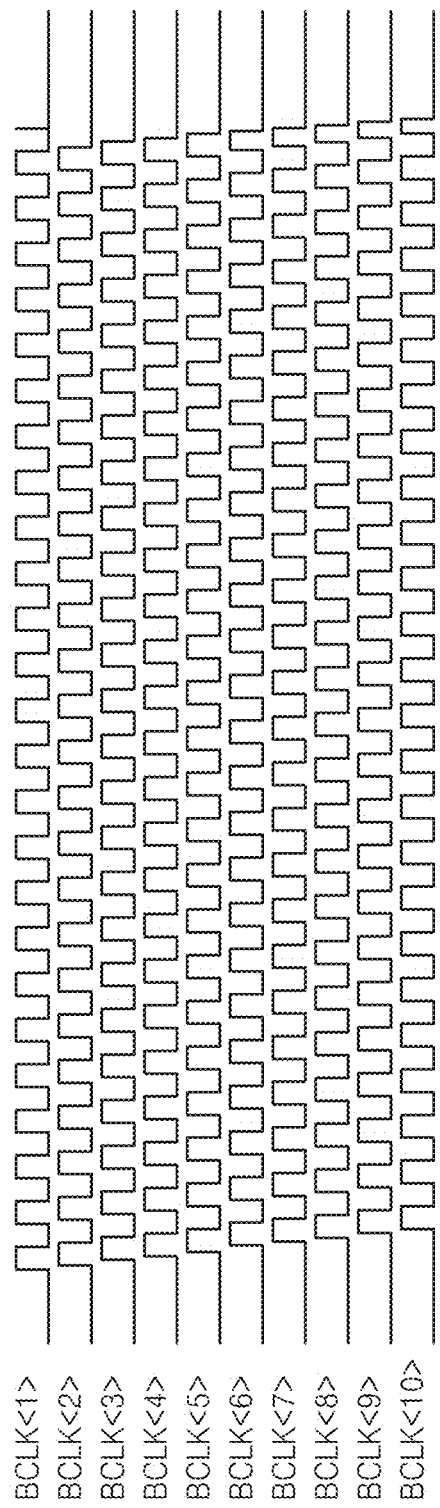
FIG. 7 is a timing chart of base clocks output from a base clock generator illustrated in FIG. 6.

FIG. 7 is a timing chart of base clocks output from the base clock generator 415 illustrated in FIG. 6. Referring to FIGS. 6 and 7, it is assumed that the base clock generator 415 generates ten base clocks BCLK<1> through BCLK<10>. However, the number of base clocks that can be generated by the base clock generator 415 may be variously changed in other exemplary embodiments. Here, a clock may refer to a clock signal and a control logic may refer to a control logic circuit or circuitry.

Figure 8:
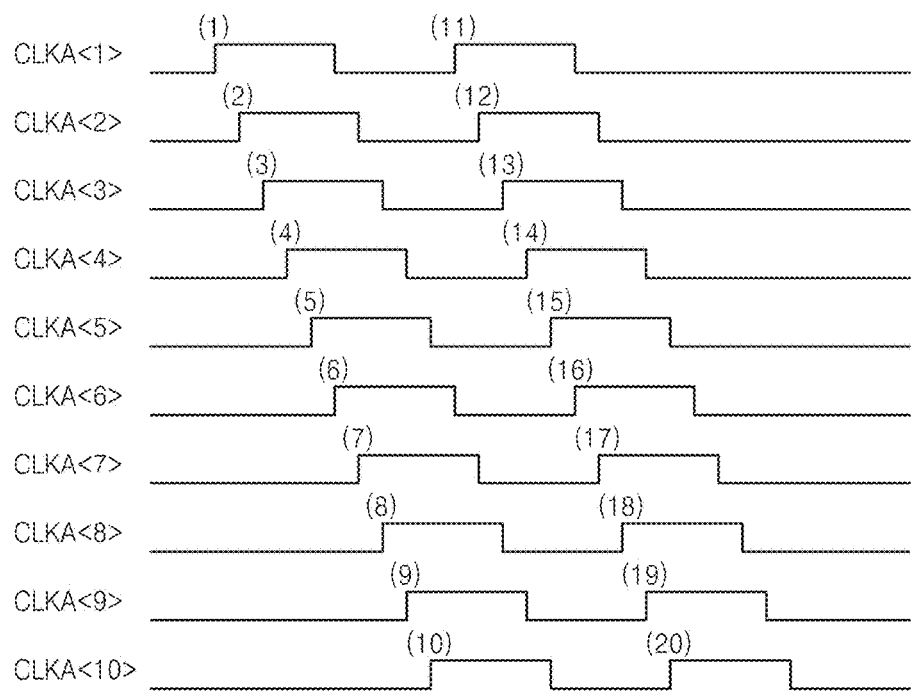
FIG. 8 is a timing chart of output signals of a first control logic illustrated in FIG. 6.

FIG. 8 is a timing chart of output signals of the first control logic 420-1 illustrated in FIG. 6. When a first division factor DV_1 is 3, the first control logic 420-1 may divide each of the ten base clocks BCLK<1> through BCLK<10> by the first division factor DV_1 (=3) and may selectively output only part of a pulse sequence of each of divided clocks CLKA<1> through CLKA<10>.

For instance, the first control logic 420-1 may divide the base clock BCLK<1> by 3 and may output only two pulses denoted by (1) and (11) in the divided clock CLKA<1>. The first control logic 420-1 may divide the base clock BCLK<2> by 3 and may output only two pulses denoted by (2) and (12) in the divided clock CLKA<2>. The first control logic 420-1 may divide the base clock BCLK<10> by 3 and may output only two pulses denoted by (10) and (20) in the divided clock CLKA<10>.

Figure 9:
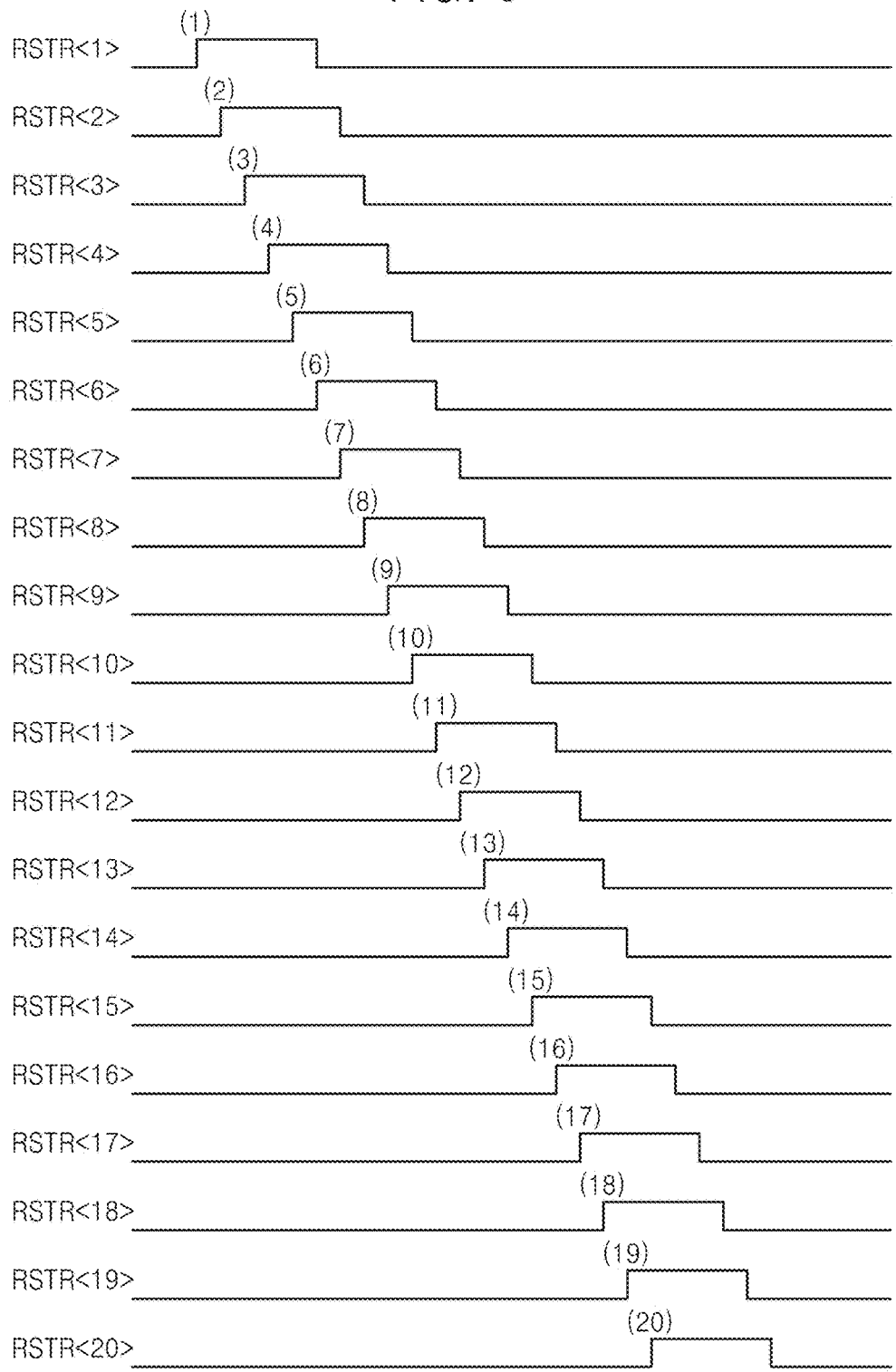
FIG. 9 is a timing chart of output signals of a first enable signal generator illustrated in FIG. 6.

The first enable signal generator 425-1 may receive ten clocks CLKA<1> through CLKA<10> having the first direction and may generate the right enable signals RSTR<1> through RSTR<20> having the timing (or the first direction) as shown in FIG. 9 in response to a control signal. The first right enable signal RSTR<1> is the pulse denoted by (1) in the clock CLKA<1> illustrated in FIG. 8, the second right enable signal RSTR<2> is the pulse denoted by (2) in the clock CLKA<2> illustrated in FIG. 8, and the tenth right enable signal RSTR<10> is the pulse denoted by (10) in the clock CLKA<10> illustrated in FIG. 8. The eleventh right enable signal RSTR<11> is the pulse denoted by (11) in the clock CLKA<1> illustrated in FIG. 8, the twelfth right enable signal RSTR<12> is the pulse denoted by (12) in the clock CLKA<2> illustrated in FIG. 8, and the 20th right enable signal RSTR<20> is the pulse denoted by (20) in the clock CLKA<10> illustrated in FIG. 8.

The first right enable signal RSTR<1> is sent to the first driver cell block 210-1, the second right enable signal RSTR<2> is sent to the second driver cell block 210-2, and the 20th right enable signal RSTR<20> is sent to the 20th driver cell block 210-2.

When a second division factor DV_2 is 1, the second control logic 420-2 may selectively output only part of each of the ten base clocks BCLK<1> through BCLK<10>. The operation of the second control logic 420-2 is the same as or similar to that of the first control logic 420-1 and the operation of the second enable signal generator 425-2 is the same as or similar to that of the first enable signal generator 425-1.

In other words, the second control logic 420-2 may output clocks CLKB having the first direction and the second enable signal generator 425-2 may output the right enable signals RSTR<21> through RSTR<40> having the first direction. At this time, N is 4 in FIG. 6.

With the exception that the first division factor DV_1 is 3 and the second division factor DV_2 is 1, the timing of the waveforms of the 21st through 40th right enable signals RSTR<21> through RSTR<40> is similar to that of the waveforms illustrated in FIG. 9. In other words, the second enable signal generator 425-2 may generate the right enable signals RSTR<21> through RSTR<40> having the first direction.

Accordingly, the 21st right enable signal RSTR<21> is sent to the 21st driver cell block 210-21, the 22nd right enable signal RSTR<22> is sent to the 22nd driver cell block 210-22, and the 40th right enable signal RSTR<40> is sent to the 40th driver cell block 210-40.

When a third division factor DV_3 is 3, the third control logic 420-3 may divide each of the ten base clocks BCLK<1> through BCLK<10> by the third division factor DV_3 (=3) and may selectively output only part of each of divided clocks CLKC (=CLKC<1> through CLKC<10>). The structure and operation of the third control logic 420-3 is the same as or similar to those of the first control logic 420-1 and the structure and operation of the third enable signal generator 425-3 is the same as or similar to those of the first enable signal generator 425-1.

The timing of the waveforms of the first through 20th left enable signals LSTR<1> through LSTR<20> generated by the third enable signal generator 425-3 is similar to that of the waveforms illustrated in FIG. 9. In other words, the third enable signal generator 425-3 may generate the left enable signals LSTR<1> through LSTR<20> having the first direction.

Accordingly, the first left enable signal LSTR<1> is sent to the 41st driver cell block 210-41, the second left enable signal LSTR<2> is sent to the 42nd driver cell block 210-42, and the 20th left enable signal LSTR<20> is sent to the 60th driver cell block 210-60.

Figure 10:
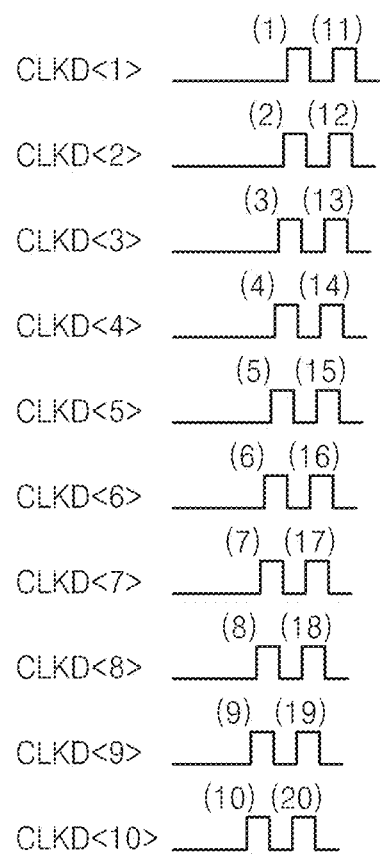
FIG. 10 is a timing chart of output signals of a fourth control logic illustrated in FIG. 6.
Figure 11:
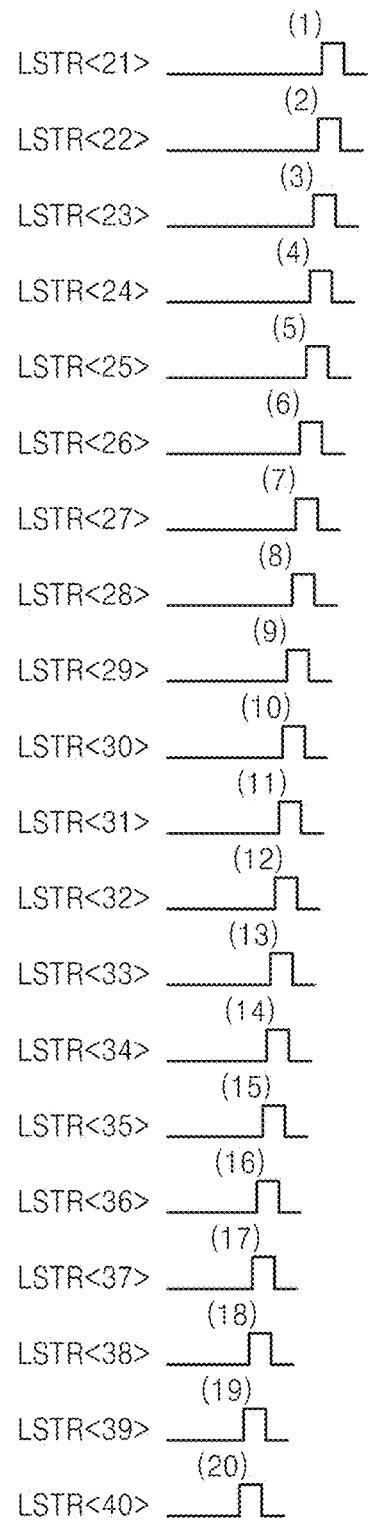
FIG. 11 is a timing chart of output signals of a fourth enable signal generator illustrated in FIG. 6.

FIG. 10 is a timing chart of output signals of the fourth control logic 420-4 illustrated in FIG. 6. FIG. 11 is a timing chart of output signals of the fourth enable signal generator 425-4 illustrated in FIG. 6.

When a fourth division factor DV_4 is 1, the fourth control logic 420-4 may divide each of the ten base clocks BCLK<1> through BCLK<10> by the fourth division factor DV_4 (=1) and may selectively output only part of a pulse sequence of each of clocks CLKD<1> through CLKD<10>.

For instance, the fourth control logic 420-4 may output only two pulses denoted by (1) and (11) in the clock CLKD<1> generated based on the base clock BCLK<1>. The fourth control logic 420-4 may output only two pulses denoted by (2) and (12) in the clock CLKD<2> generated based on the base clock BCLK<2>. The fourth control logic 420-4 may output only two pulses denoted by (10) and (20) in the clock CLKD<10> generated based on the base clock BCLK<10>.

The fourth enable signal generator 425-4 may receive ten clocks CLKD<1> through CLKD<10> and may generate the left enable signals LSTR<21> through LSTR<40> having the timing as shown in FIG. 11 in response to a control signal. In other words, the fourth enable signal generator 425-4 may generate the left enable signals LSTR<21> through LSTR<40> having the second direction.

The 21st left enable signal LSTR<21> is the pulse denoted by (1) in the clock CLKD<1> illustrated in FIG. 10, the 22nd left enable signal LSTR<22> is the pulse denoted by (2) in the clock CLKD<2> illustrated in FIG. 10, and the 30th left enable signal LSTR<30> is the pulse denoted by (10) in the clock CLKD<10> illustrated in FIG. 10. The 31st left enable signal LSTR<31> is the pulse denoted by (11) in the clock CLKD<1> illustrated in FIG. 10, the 32nd left enable signal LSTR<32> is the pulse denoted by (12) in the clock CLKD<2> illustrated in FIG. 10, and the 40th left enable signal LSTR<40> is the pulse denoted by (20) in the clock CLKD<10> illustrated in FIG. 10.

The 21st left enable signal LSTR<21> is sent to the 61st driver cell block 210-61, the 22nd left enable signal LSTR<22> is sent to the 62nd driver cell block 210-62, and the 40th left enable signal LSTR<40> is sent to the 80th driver cell block 210-80.

Each of the control logics 420-1 through 420-4 may generate clocks having the delay (or timing) shown in FIG. 8 or clocks having the delay (or timing) shown in FIG. 10 based on a control signal SWI. In other words, each of the control logics 420-1 through 420-4 may control the generation direction (e.g., the first or second direction) of the clock signals based on the control signal SWI. In addition, each of the control logics 420-1 through 420-4 may control the number of pulses included in the clock signals based on the control signal SWI. Each of the enable signal generators 425-1 through 425-4 may control the generation timing of enable signals. The control signal SWI may include at least one bit. Each bit may be defined as logic 1 or logic 0.

Figure 12:
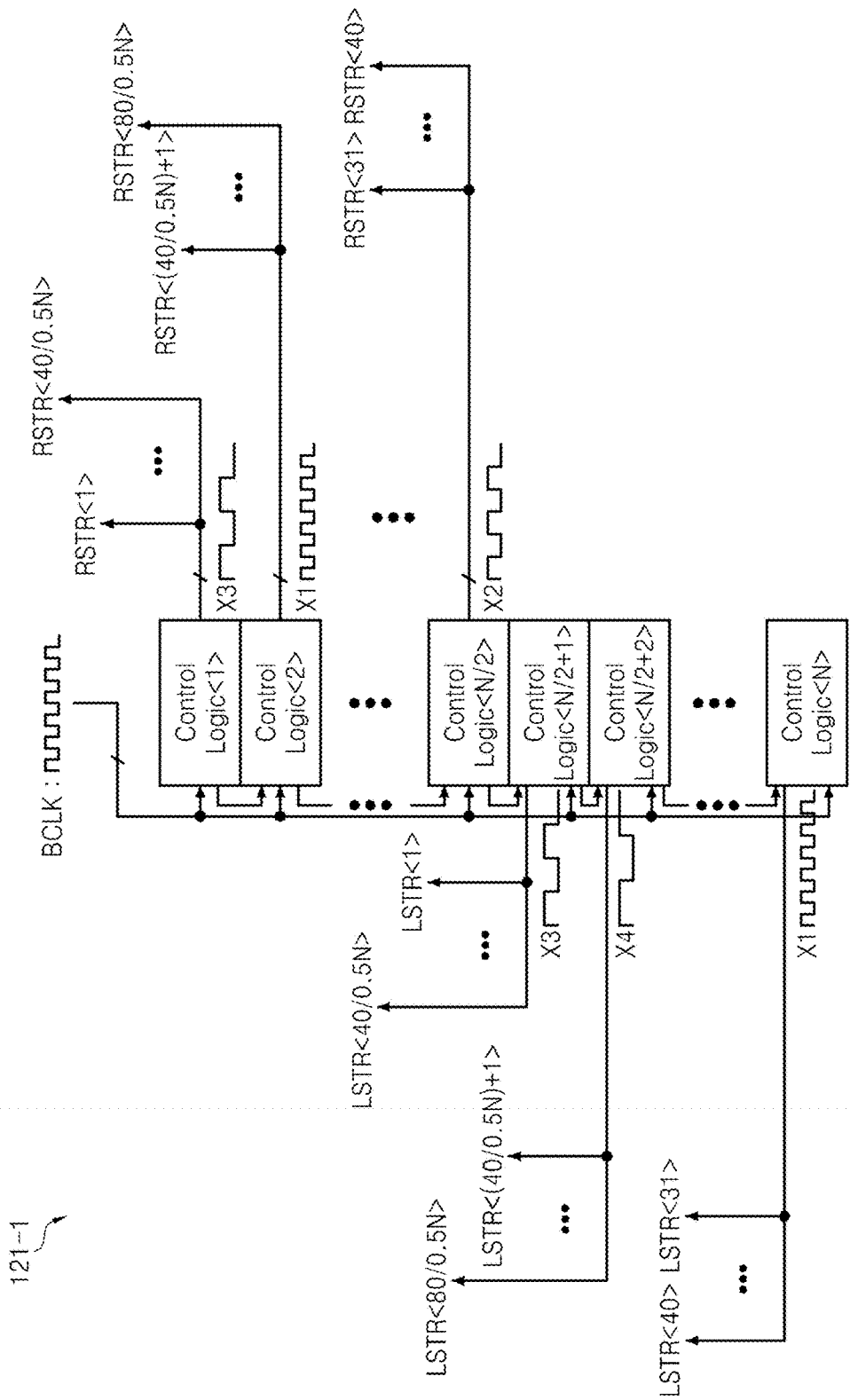
FIG. 12 is a block diagram of the control logic circuit block illustrated in FIG. 4 according to other exemplary embodiments of the inventive concept.

FIG. 12 is a block diagram of the control logic circuit block 121-1 illustrated in FIG. 4 according to other exemplary embodiments of the inventive concept. Referring to FIGS. 6 and 12, the control logic circuit block 121-1 may include a plurality of control logics. Each of the control logics may control the generation timing and/or direction of enable signals RSTR<1> through RSTR<40/0.5N>, RSTR<(40/0.5N)+1> through RSTR<80/0.5N>, RSTR<31> through RSTR<40>, LSTR<1> through LSTR<40/0.5N>, LSTR<(40/0.5N)+1> through LSTR<80/0.5N>, LSTR<31> through and LSTR<40> in response to control signals. At this time, N is 8 in FIG. 12.

Figure 13:
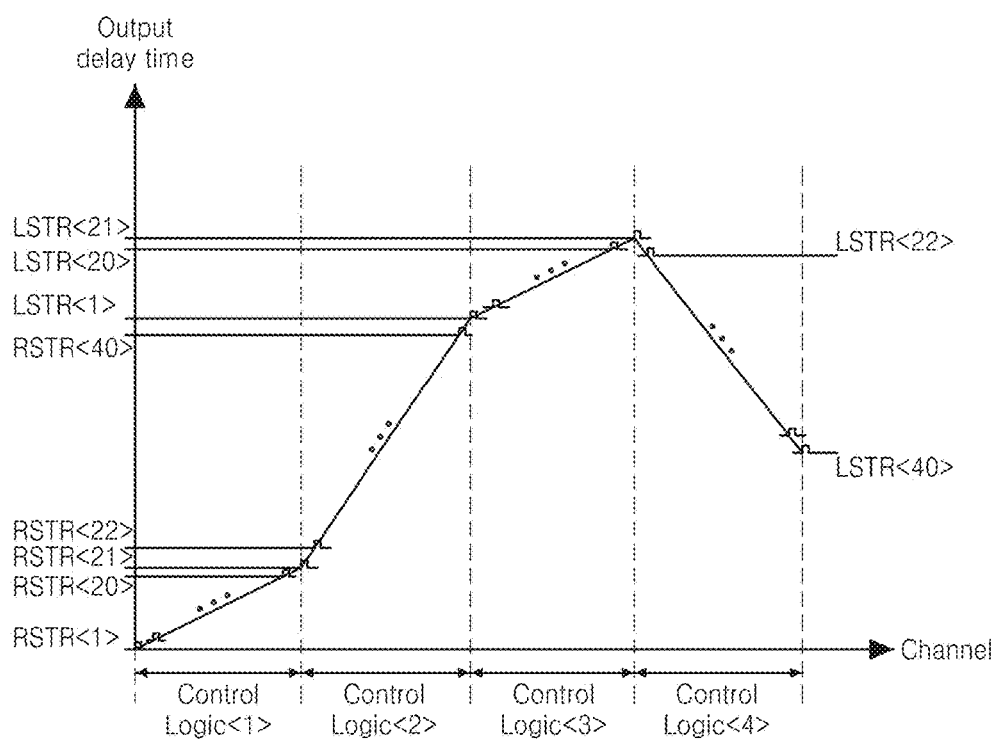
FIG. 13 is a diagram of output delay times of output signals of the control logic circuit block illustrated in FIG. 4 or 12.

FIG. 13 is a diagram of output delay times of output signals of the control logic circuit block 121-1 illustrated in FIG. 4 or 12. Referring to FIGS. 1, 4, 6, and 13, the right enable signals RSTR<1> through RSTR<20> having the first direction, which drive 240 source lines Y1R through Y240R included in the first region RG1, may be generated using the first control logic 420-1 and the first enable signal generator 425-1; the right enable signals RSTR<21> through RSTR<40> having the first direction, which drive 240 source lines Y241R through Y480R included in the first region RG1, may be generated using the second control logic 420-2 and the second enable signal generator 425-2; the left enable signals LSTR<1> through LSTR<20> having the second direction, which drive 240 source lines Y481R through Y720R included in the second region RG2, may be generated using the third control logic 420-3 and the third enable signal generator 425-3; and the left enable signals LSTR<21> through LSTR<40> having the second direction, which drive 240 source lines Y721R through Y960R included in the second region RG2, may be generated using the fourth control logic 420-4 and the fourth enable signal generator 425-4.

Referring to FIG. 13, a delay between two right enable signals RSTR<20> and RSTR<21> may be different from a delay between two right enable signals RSTR<21> and RSTR<22>. In addition, a delay between two right enable signals RSTR<1> and RSTR<2> may be different from a delay between two right enable signals RSTR<22> and RSTR<23>.

A delay between two enable signals RSTR<40> and LSTR<1> may be different from a delay between two enable signals LSTR<1> and LSTR<2>. In addition, a delay between two right enable signals RSTR<39> and RSTR<40> may be different from a delay between two left enable signals LSTR<2> and LSTR<3>.

A delay between two left enable signals LSTR<20> and LSTR<21> may be different from a delay between two left enable signals LSTR<21> and LSTR<22>. In addition, a delay between two left enable signals LSTR<19> and LSTR<20> may be different from a delay between two left enable signals LSTR<22> and LSTR<23>.

A division factor may refer to a spread step. As has been described with reference to FIG. 6, the first division factor DV_1 assigned to the first control logic 420-1 is 3, the second division factor DV_2 assigned to the second control logic 420-2 is 1, the third division factor DV_3 assigned to the third control logic 420-3 is 3, and the fourth division factor DV_4 assigned to the fourth control logic 420-4 is 1. However, referring to FIG. 13, mismatch does not occur at a border at which a spread step changes.

For instance, the second control logic 420-2 may determine the generation timing of the 21st right enable signal RSTR<21> using output signals of the first control logic 420-1, the third control logic 420-3 may determine the generation timing of the first left enable signal LSTR<1> using output signals of the second control logic 420-2, and the fourth control logic 420-4 may determine the generation timing of the 21st left enable signal LSTR<21> using output signals of the third control logic 420-3.

Figure 14:
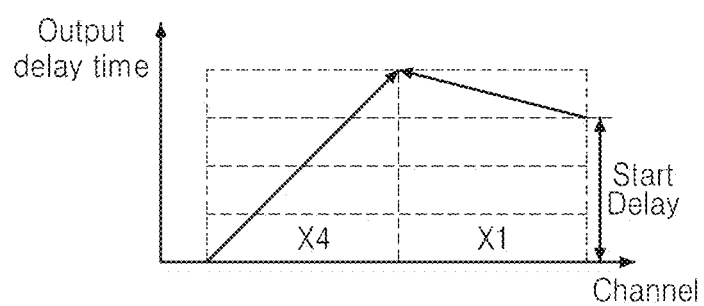
FIG. 14 is a timing chart for explaining an output delay according to some exemplary embodiments of the inventive concept.

FIG. 14 is a timing chart for explaining an output delay according to some exemplary embodiments of the inventive concept. Referring to FIGS. 6, 13, and 14, when the division factor (or spread step) of the first control logic 420-1 is 4, the division factor (or spread step) of the second control logic 420-2 is 1, and a start delay exists in the second control logic 420-2; mismatch at the border between enable signals (e.g., RSTR<20> and RSTR<21>) which occurs due to a difference between the division factor of the first control logic 420-1 and the division factor of the second control logic 420-2 is eliminated in the exemplary embodiments of the inventive concept.

FIG. 15 is a diagram illustrating the start delay and the output delay time of each of source driver ICs according to some exemplary embodiments of the inventive concept. Referring to FIGS. 13 through 15, when the second control logic 420-2 is controlled so that a first start delay D1 exists between a first logic clock LOGIC1_CLK and a second logic clock LOGIC2_CLK, the third control logic 420-3 is controlled so that a second start delay D2 exists between the first logic clock LOGIC1_CLK and a third logic clock LOGIC3_CLK, and the fourth control logic 420-4 is controlled so that a third start delay D3 exists between the first logic clock LOGIC1_CLK and a fourth logic clock LOGIC4_CLK; mismatch at each of borders (e.g., between RSTR<20> and RSTR<21>, between RSTR<40> and LSTR<1>, and between LSTR<20> and LSTR<21>) where a spread step changes can be eliminated.

The first logic clock LOGIC1_CLK may be involved in the generation of the first right enable signal RSTR<1>, the second logic clock LOGIC2_CLK may be involved in the generation of the 21st right enable signal RSTR<21>, the third logic clock LOGIC3_CLK may be involved in the generation of the first left enable signal LSTR<1>, and the fourth logic clock LOGIC4_CLK may be involved in the generation of the 21st left enable signal LSTR<21>. Alternatively, the first logic clock LOGIC1_CLK may be involved in the generation of the clock CLKA<1>, the second logic clock LOGIC2_CLK may be involved in the generation of the clock CLKB<1>, the third logic clock LOGIC3_CLK may be involved in the generation of the clock CLKC<1>, and the fourth logic clock LOGIC4_CLK may be involved in the generation of the clock CLKD<1>.

Figure 16:
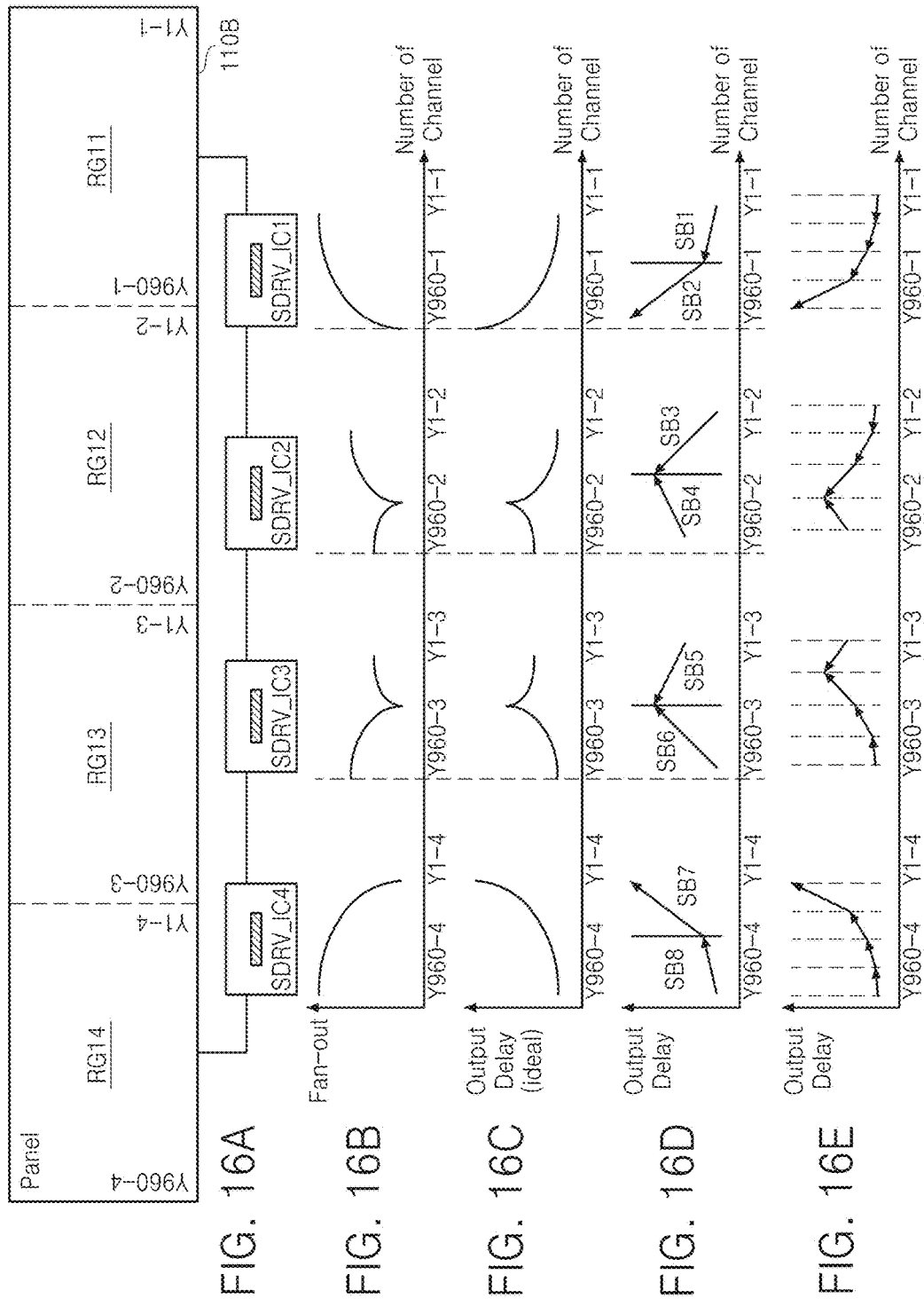
FIGS. 16A through 16E are conceptual diagrams for explaining the fan-out and the output delay of each of source driver ICs according to some exemplary embodiments of the inventive concept.

FIGS. 16A through 16E are conceptual diagrams for explaining the fan-out and the output delay of each of source driver ICs SDRV_IC1 through SDRV_IC4 according to some exemplary embodiments of the inventive concept. Referring to FIG. 16A, it is assumed that the first source driver IC SDRV_IC1 drives the source lines Y1-1 through Y960-1 formed in the first region RG11, the second source driver IC SDRV_IC2 drives the source lines Y1-2 through Y960-2 formed in the second region RG12, the third source driver IC SDRV_IC3 drives the source lines Y1-3 through Y960-3 formed in the third region RG13, the fourth source driver IC SDRV_IC4 drives the source lines Y1-4 through Y960-4 formed in the fourth region RG14, and the structure and operations of each of the source driver ICs SDRV_IC1 through SDRV_IC4 are the same as or similar to those of the first source driver IC 121 described with reference to FIGS. 3 through 15.

FIG. 16B shows a fan-out with respect to the position of each of the source driver ICs SDRV_IC1 through SDRV_IC4. FIG. 16C shows an ideal output delay with respect to the position of each of the source driver ICs SDRV_IC1 through SDRV_IC4.

FIG. 16D shows an actual output delay with respect to the position of each of the source driver ICs SDRV_IC1 through SDRV_IC4. When the first source driver IC SDRV_IC1 divide the first region RG11 into a first sub region SB1 and a second sub region SB2 to control the first region RG11, a plurality of first enable signals may control the activation of the source lines (e.g., Y1-1 through Y480-1) included in the first sub region SB1 and a plurality of second enable signals may control the activation of the source lines (e.g., Y481-1 through Y960-1) included in the second sub region SB2. As shown in FIG. 16D, a delay (or an output delay) between enable signals (or output signals) respectively provided for two adjacent source lines included in the first sub region SB1 may be controlled to be different from a delay (or an output delay) between enable signals (or output signals) respectively provided for two adjacent source lines included in the second sub region SB2.

When the second source driver IC SDRV_IC2 divide the second region RG12 into a third sub region SB3 and a fourth sub region SB4 to control the second region RG12, a plurality of third enable signals may control the activation of the source lines (e.g., Y1-2 through Y480-2) included in the third sub region SB3 and a plurality of fourth enable signals may control the activation of the source lines (e.g., Y481-2 through Y960-2) included in the fourth sub region SB4. As shown in FIG. 16D, a delay (or an output delay) between enable signals (or output signals) respectively provided for two adjacent source lines included in the third sub region SB3 may be controlled to be different from a delay (or an output delay) between enable signals (or output signals) respectively provided for two adjacent source lines included in the fourth sub region SB4.

When the third source driver IC SDRV_IC3 divide the third region RG13 into a fifth sub region SB5 and a sixth sub region SB6 to control the third region RG13, a plurality of fifth enable signals may control the activation of the source lines (e.g., Y1-3 through Y480-3) included in the fifth sub region SB5 and a plurality of sixth enable signals may control the activation of the source lines (e.g., Y481-3 through Y960-3) included in the sixth sub region SB6. As shown in FIG. 16D, a delay (or an output delay) between enable signals (or output signals) respectively provided for two adjacent source lines included in the fifth sub region SB5 may be controlled to be different from a delay (or an output delay) between enable signals (or output signals) respectively provided for two adjacent source lines included in the sixth sub region SB6.

When the fourth source driver IC SDRV_IC4 divide the fourth region RG14 into a seventh sub region SB7 and an eighth sub region SB8 to control the fourth region RG14, a plurality of seventh enable signals may control the activation of the source lines (e.g., Y1-4 through Y480-4) included in the seventh sub region SB7 and a plurality of eighth enable signals may control the activation of the source lines (e.g., Y481-4 through Y960-4) included in the eighth sub region SB8. As shown in FIG. 16D, a delay (or an output delay) between enable signals (or output signals) respectively provided for two adjacent source lines included in the seventh sub region SB7 may be controlled to be different from a delay (or an output delay) between enable signals (or output signals) respectively provided for two adjacent source lines included in the eighth sub region SB8.

As described above with reference to FIG. 16D, each of the source driver ICs SDRV_IC1 through SDRV_IC4 may include two control logics and two enable signal generators.

Referring to FIG. 16E, each of the regions RG11 through RG14 may be divided into four sub regions. At this time, each of the source driver ICs SDRV_IC1 through SDRV_IC4 may include four control logics and four enable signal generators.

A plurality of first enable signals generated by the first source driver IC SDRV_IC1 may control the activation of source lines (e.g., Y1-1 through Y240-1) included in the first sub region of the first region RG11. A plurality of second enable signals generated by the first source driver IC SDRV_IC1 may control the activation of source lines (e.g., Y241-1 through Y480-1) included in the second sub region of the first region RG11. A plurality of third enable signals generated by the first source driver IC SDRV_IC1 may control the activation of source lines (e.g., Y481-1 through Y720-1) included in the third sub region of the first region RG11. A plurality of fourth enable signals generated by the first source driver IC SDRV_IC1 may control the activation of source lines (e.g., Y721-1 through Y960-1) included in the fourth sub region of the first region RG11.

A delay between output signals respectively provided for two adjacent source lines among the source lines Y1-1 through Y240-1 included in the first sub region may be controlled to be different from a delay between output signals respectively provided for two adjacent source lines among the source lines Y241-1 through Y480-1 included in the second sub region. A delay between output signals respectively provided for two adjacent source lines among the source lines Y241-1 through Y480-1 included in the second sub region may be controlled to be different from a delay between output signals respectively provided for two adjacent source lines among the source lines Y481-1 through Y720-1 included in the third sub region. A delay between output signals respectively provided for two adjacent source lines among the source lines Y481-1 through Y720-1 included in the third sub region may be controlled to be different from a delay between output signals respectively provided for two adjacent source lines among the source lines Y721-1 through Y960-1 included in the fourth sub region.

When FIGS. 2D and 16D or FIGS. 2D and 16E are compared with each other, the first source driver IC SDRV_IC1 may control a delay or an output delay between output signals respectively provided for two source lines included in each sub region included in the first region RG11 to be different based on the position of the source lines. The operation of the first source driver IC SDRV_IC1 is the same as or similar to that of each of the other source driver ICs SDRV_IC2 through SDRV_IC4. As shown in FIG. 16E, a delay between output signals respectively provided for two adjacent source lines included in each sub region included in any one of the regions RG12, RG13, and RG14 may be controlled to be different.

Figure 17:
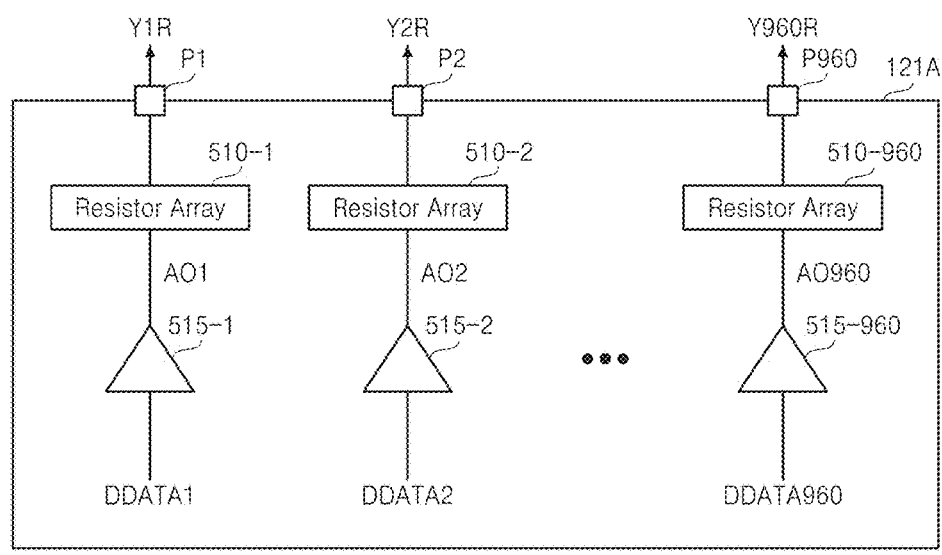
FIG. 17 is a schematic block diagram of a source driver IC which controls an output resistance for each channel according to some exemplary embodiments of the inventive concept.

FIG. 17 is a schematic block diagram of a source driver IC 121A which controls an output resistance for each channel according to some exemplary embodiments of the inventive concept. Referring to FIGS. 1 and 17, the structure of the source driver IC 121 is the same as or similar to that of the source driver IC 123. Therefore, only the structure of the source driver IC 121 will be described through a description of the source driver IC 121A illustrated in FIG. 17, which is an example of the source driver IC 121 illustrated in FIG. 1.

The source driver IC 121A may include a plurality of output buffers 515-1 through 515-960, a plurality of resistor arrays 510-1 through 510-960, and a plurality of output pads P1 through P960. An output buffer may also be called a channel amplifier. The output buffers 515-1 through 515-960 may buffer (or amplify) input signals (or data signals) DDATA1 through DDATA960, respectively, and may output buffered (or amplified) signals AO1 through AO960, respectively, to the resistor arrays 510-1 through 510-960, respectively.

The source driver IC 121A may compensate for or control the fan-out of the flat panel display (or curved display) 110 and/or the RC delay of the gate lines formed in the flat panel display 110 using a resistance of each of the resistor arrays 510-1 through 510-960. In other words, the resistance of the resistor arrays 510-1 through 510-960 may be different depending on the position of the resistor arrays 510-1 through 510-960. The resistor arrays 510-1 through 510-960 may be connected to the source lines Y1R through Y960R, respectively, through the pads P1 through P960 (each of which collectively refers to a pad formed in the source driver IC 121A and a pad formed in the flat panel display 110). As shown in FIGS. 16C and 16D, an output delay may be determined according to the resistance of each of the resistor arrays 510-1 through 510-960.

Referring to FIGS. 1 and 17, the source driver IC 121A (i.e., the source driver 121) includes the first channel amplifiers 515-1 through 515-960 which amplify the first data signals DDATA1 through DDATA960, respectively, and generate the first output signals AO1 through AO960, respectively; the pads P1 through P960 which are connected to the source lines Y1R through Y960R, respectively; and the resistor arrays 510-1 through 510-960 which are connected between the respective channel amplifiers 515-1 through 515-960 and the respective pads P1 through P960. Each of the first resistor arrays 510-1 through 510-960 includes z resistors, where z is a natural number. The z resistors may have the same or different resistances.

The number of arrangements of z resistors (or the number of resistances determined using z resistors or the number of combinations of resistances determined using at least one of the z resistors) is greater than $2^z$. The resistance of each of the resistor arrays 510-1 through 510-960 is determined by the arrangement of z resistors included in each resistor array. The z resistors may be arranged in a matrix form, but the inventive concept is not restricted to the current exemplary embodiments.

Referring to FIGS. 1 and 17, the source driver IC 123 having the same structure as the source driver IC 121A includes channel amplifiers which amplify data signals, respectively, and generate output signals, respectively; pads connected to source lines Y1L through Y960L, respectively; and resistor arrays which are connected between the respective channel amplifiers and the respective pads and each of which includes z resistors. The resistance of each of the resistor arrays is determined by the arrangement of z resistors included in each resistor array.

Figure 18:
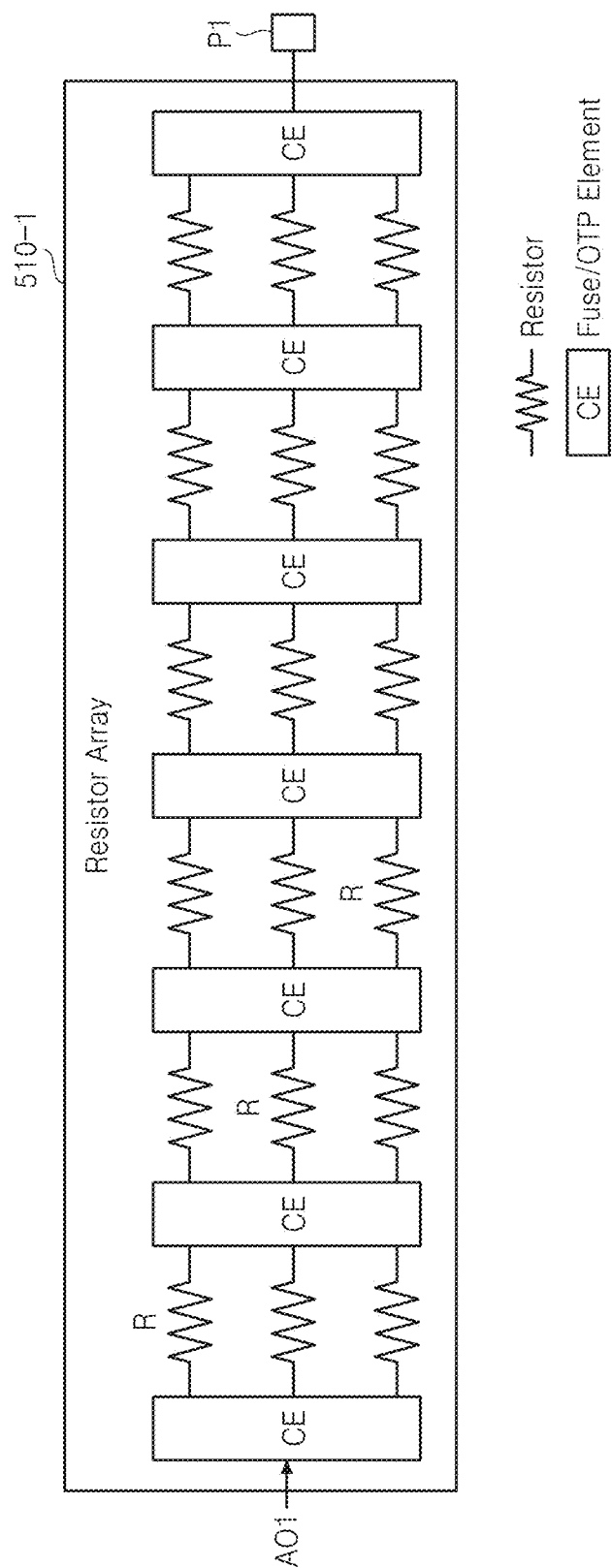
FIG. 18 is a detailed diagram of a resistor array illustrated in FIG. 17 according to some exemplary embodiments of the inventive concept.

FIG. 18 is a detailed diagram of the resistor array 510-1 illustrated in FIG. 17 according to some exemplary embodiments of the inventive concept. The resistor arrays 510-1 through 510-960 have the same or similar structures, and therefore, only the structure of the resistor array 510-1 will be described. The resistor array 510-1 may include a plurality of resistors R and a plurality of connecting elements CE. Each of the connecting elements CE may be a fuse, an e-fuse, or a one-time programmable (OTP) device but is not restricted thereto. Since at least two of the resistors R are connected in series and/or in parallel by the connecting elements CE, the resistance of the resistor array 510-1 may be determined by the connecting elements CE. In detail, some of the resistors R may be connected in series and the others of the resistors R may be connected in parallel by the connecting elements CE.

For example, when the first resistor array 510-1 includes z resistors, where z is a natural number of at least 2; the maximum number of arrangements of z resistors determined according to the arrangements of the connecting elements CE (or the number of resistances which can be determined using the z resistors) may be greater than $2^z$. For example, when the first resistor array 510-1 includes 24 resistors and the resistance of each of the 24 resistors is 100Ω, the resistance of the first resistor array 510-1 which can be determined using the z resistors may range from 4.17 (=100Ω/24) to 2400Ω (=100Ω*24).

Figure 19:
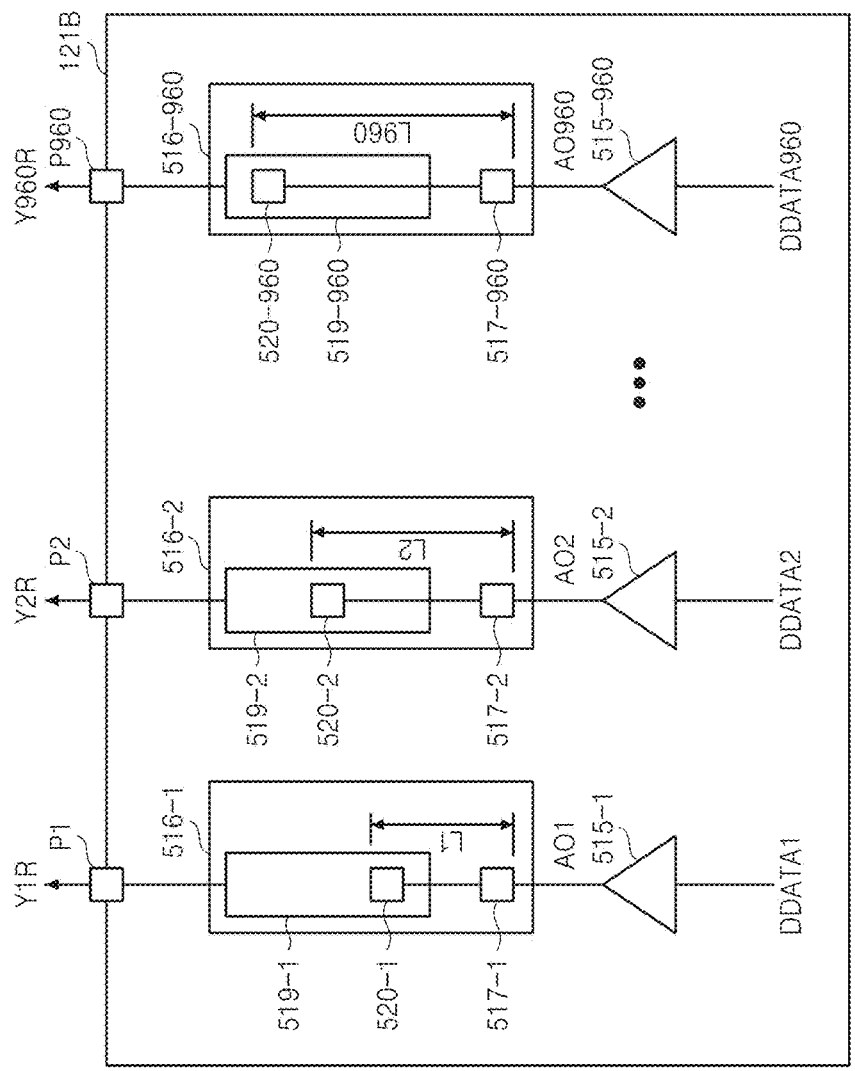
FIG. 19 is a schematic block diagram of a source driver IC which controls an output resistance for each channel according to other exemplary embodiments of the inventive concept.

FIG. 19 is a schematic block diagram of a source driver IC 121B which controls an output resistance for each channel according to other exemplary embodiments of the inventive concept. Referring to FIGS. 1 and 19, the structure of the source driver IC 121 is the same as or similar to that of the source driver IC 123. Therefore, only the structure of the source driver IC 121 will be described through a description of the source driver IC 121B illustrated in FIG. 19, which is another example of the source driver IC 121 illustrated in FIG. 1.

The source driver IC 121B may include a plurality of the output buffers 515-1 through 515-960, a plurality of resistance control circuits 516-1 through 516-960, and a plurality of the pads P1 through P960.

The resistance control circuits 516-1 through 516-960 may include first metal contacts 517-1 through 517-960, respectively, and resistor bars 519-1 through 519-960, respectively. The resistor bars 519-1 through 519-960 may be metal and may include second metal contacts 520-1 through 520-960, respectively. A resistance between the center of each of the first metal contacts 517-1 through 517-960 and the center of a corresponding one of the second metal contacts 520-1 through 520-960 may be determined according to corresponding one of distances L1 through L960. The distances L1 through L960 in metal contact pairs 517-1 and 520-1, 517-2 and 520-2, and 517-960 and 520-960 may be different from one another.

The resistance control circuits 516-1 through 516-960 may be connected to the source lines Y1R through Y960R, respectively, through the pads P1 through P960 (each of which collectively refers to a pad formed in the first source driver IC 121B and a pad formed in the flat panel display 110). As shown in FIGS. 16C and 16D, an output delay may be determined according to the resistance of between the center of each of the first metal contacts 517-1 through 517-960 and the center of a corresponding one of the second metal contacts 520-1 through 520-960.

The first source driver IC 121B may compensate for or control the fan-out of the flat panel display (or curved display) 110 and/or the RC delay of the gate lines formed in the flat panel display 110 using the first metal contacts 517-1 through 517-960 and the second metal contacts 520-1 through 520-960. The distance between the centers of respective first and second metal contacts in a pair may be controlled by predetermined units (e.g., 0.01 μm) in order to tune a resistance for each channel (i.e., output channel or source line), but the inventive concept is not restricted to the current exemplary embodiments.

Figure 20:
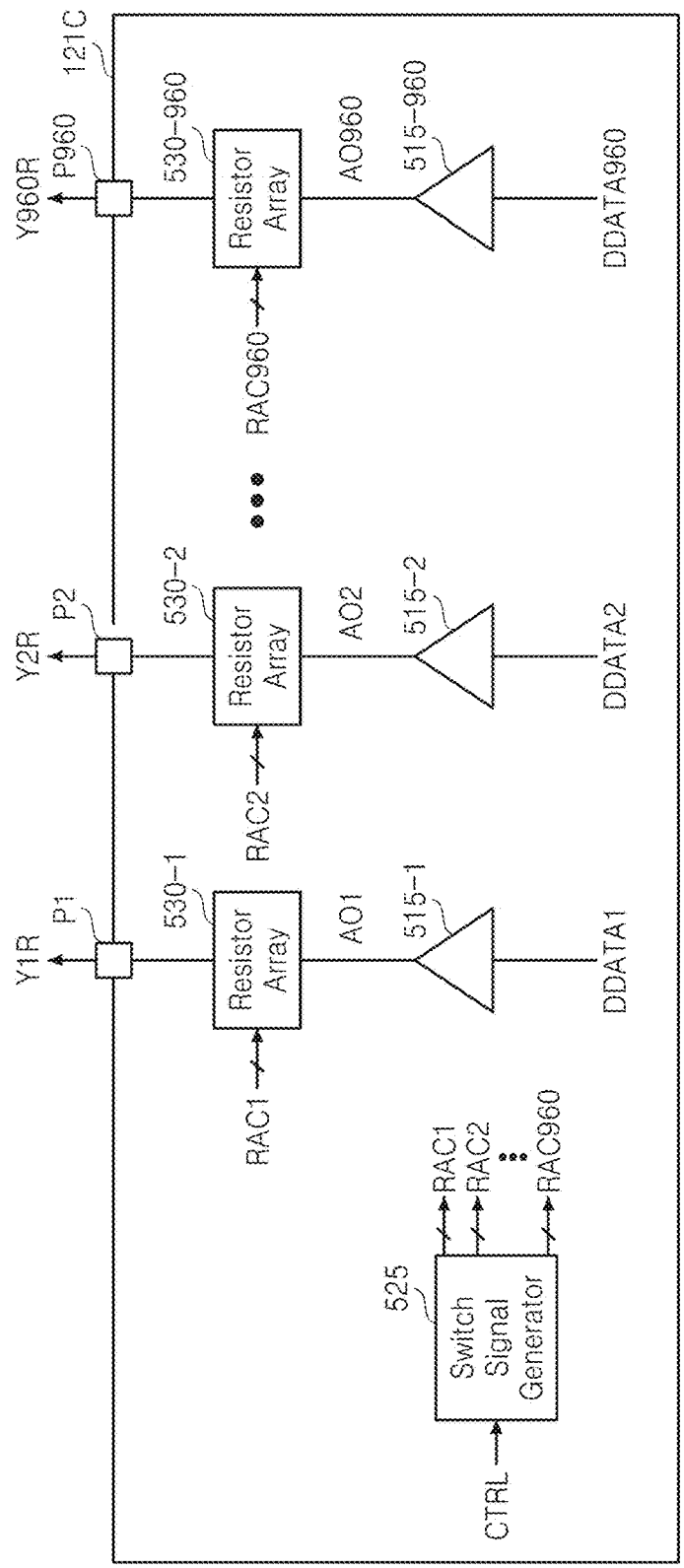
FIG. 20 is a schematic block diagram of a source driver IC which controls an output resistance for each channel according to further exemplary embodiments of the inventive concept.

FIG. 20 is a schematic block diagram of a source driver IC 121C which controls an output resistance for each channel according to further exemplary embodiments of the inventive concept. Referring to FIGS. 1 and 20, the structure of the source driver IC 121 is the same as or similar to that of the source driver IC 123. Therefore, only the structure of the source driver IC 121 will be described through a description of the source driver IC 121C illustrated in FIG. 20, which is an example of the source driver IC 121 illustrated in FIG. 1.

The source driver IC 121C may include a plurality of the output buffers 515-1 through 515-960, a switch signal generator 525, a plurality of resistor arrays 530-1 through 530-960, and a plurality of output pads P1 through P960. The switch signal generator 525 may generate switch signals RAC1 through RAC960 based on a control signal CTRL. Each of the switch signals RAC1 through RAC960 may include a plurality of switch signals. The specific arrangement of a plurality of switches formed in each of resistor array 530-1 through 530-960 may be set based on corresponding one of the switch signals RAC1 through RAC960. Hence, the resistance of each of the resistor arrays 530-1 through 530-960 may be determined based on the arrangement of the plurality of switches.

The resistor arrays 530-1 through 530-960 may be connected to the source lines Y1R through Y960R, respectively, through the pads P1 through P960 (each of which collectively refers to a pad formed in the first source driver IC 121C and a pad formed in the flat panel display 110). As shown in FIGS. 16C and 16D, an output delay may be determined based on the resistance of each of the resistor arrays 530-1 through 530-960.

Figure 21:
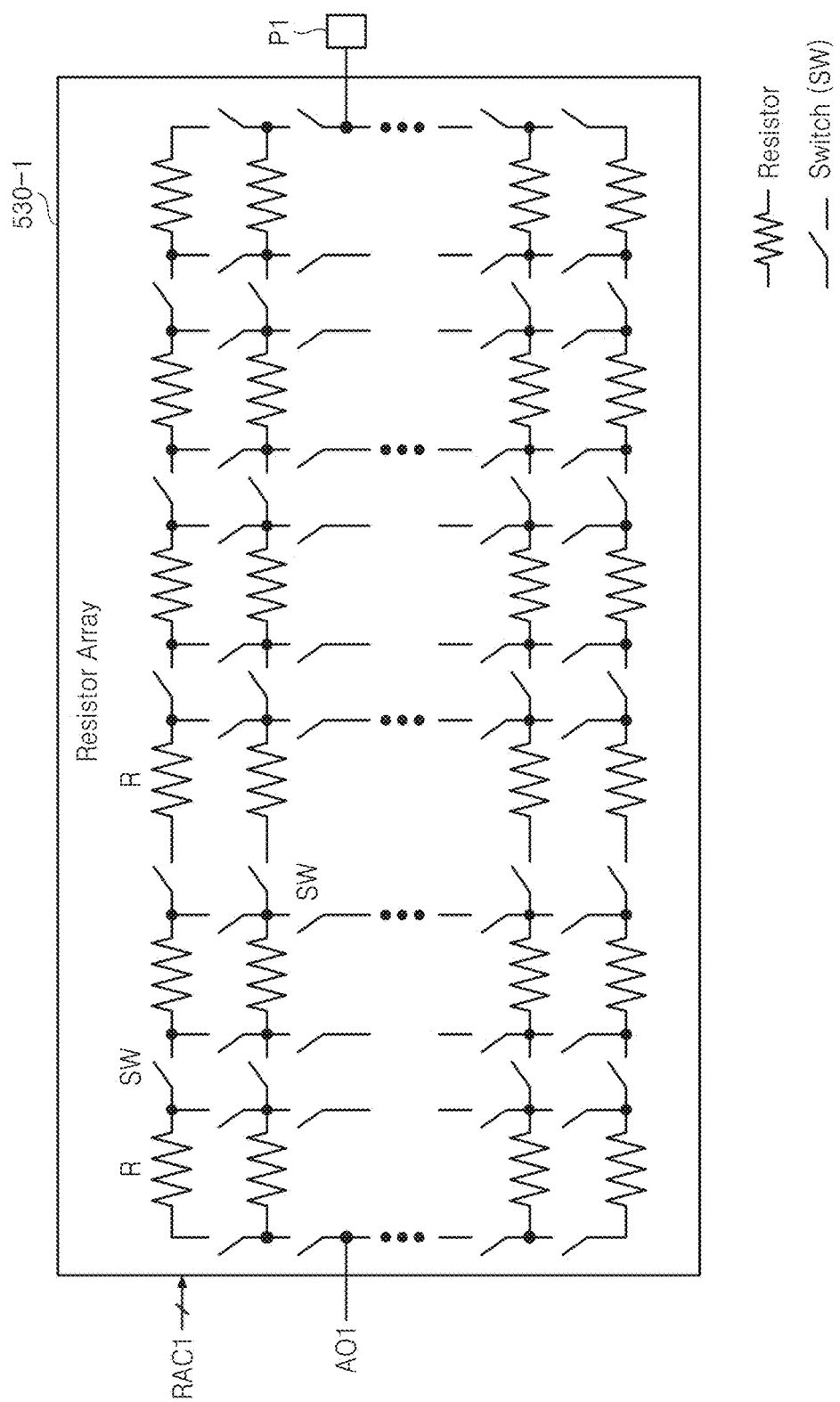
FIG. 21 is a detailed diagram of a resistor array illustrated in FIG. 20 according to some exemplary embodiments of the inventive concept.

FIG. 21 is a detailed diagram of the resistor array 530-1 illustrated in FIG. 20 according to some exemplary embodiments of the inventive concept. The resistor arrays 530-1 through 530-960 have the same or similar structures, and therefore, only the structure of the first resistor array 530-1 will be described. The first resistor array 530-1 may include a plurality of resistors R and a plurality of switches SW. Since at least two of the resistors R are connected in series and/or in parallel by the arrangement of the switches SW (for example, the arrangement is determined by on or off states of each of the switches SW), the resistance of the first resistor array 530-1 may be determined by the arrangement of the switches SW. In other words, the resistance of each of the resistor arrays 530-1 through 530-960 may be adaptively controlled based on corresponding one of the switch signals RAC1 through RAC960. On or off states of each of the switches SW may be determined by the switch signal RAC1. Each of the resistor arrays 530-1 through 530-960 may be implemented in a matrix form, but the inventive concept is not restricted to the current exemplary embodiments.

For example, when the first resistor array 530-1 includes z resistors, the maximum number of arrangements of the z resistors determined according to the arrangements of the switches SW (or the number of resistances determined using the z resistors or the number of combinations of resistances determined using at least one of the z resistors) may be greater than $2^z$. When the first resistor array 530-1 includes 24 resistors and the resistance of each of the 24 resistors is 100Ω, the resistance of the first resistor array 530-1 determined based on the z resistors may range from 4.17 (=100Ω/24) to 2400Ω (=100Ω*24).

The source driver IC 121C may compensate for or control the fan-out of the flat panel display (or curved display) 110, the RC delay of the gate lines formed in the flat panel display 110, and the RC delay of the source lines formed in the flat panel display 110 using a resistance of each of the resistor arrays 530-1 through 530-960.

Figure 22:
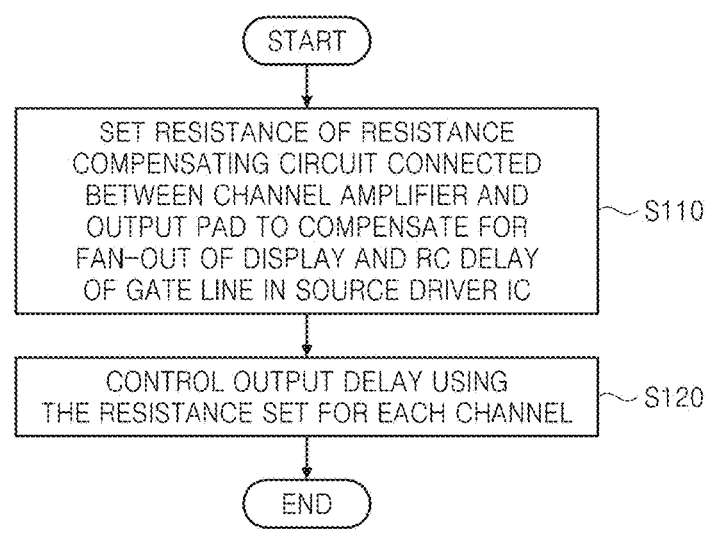
FIG. 22 is a flowchart of the operation of the source driver IC illustrated in FIG. 17 or 19.

FIG. 22 is a flowchart of the operation of the source driver IC 121A or 121B illustrated in FIG. 17 or 19. Referring to FIGS. 1, 17, 19, and 22, in order to compensate for the fan-out of the flat panel display 110 and the RC delay of the gate lines formed in the flat panel display 110 for each channel in the source driver IC 121A or 121B, the resistance of each of resistance compensating circuits connected between the respective channel amplifiers 515-1 through 515-960 and the respective output pads P1 through P960 of the source driver IC 121A or 121B is set for each channel in operation S110. The resistance compensating circuits may refer to the resistor arrays 510-1 through 510-960 illustrated in FIG. 17 or the resistance control circuits 516-1 through 516-960 illustrated in FIG. 19.

The source driver IC 121A or 121B may control an output delay for each channel, as illustrated in FIGS. 16C and 16D, using the resistance set for each channel in operation S120.

Figure 23:
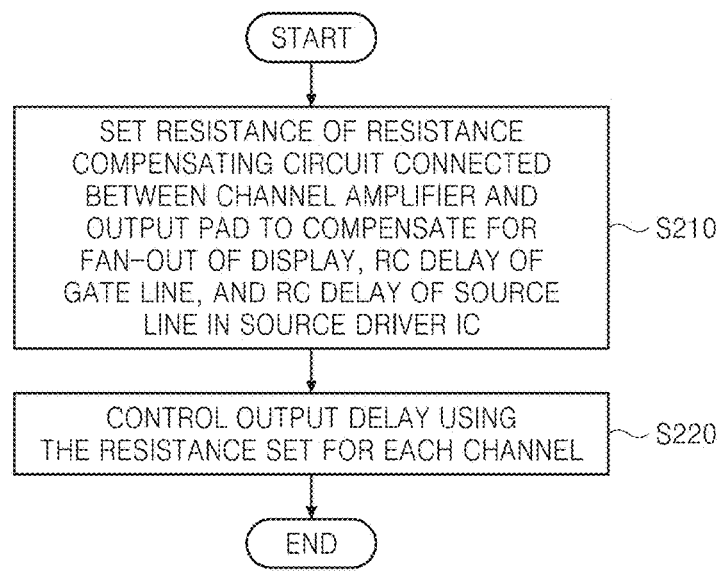
FIG. 23 is a flowchart of the operation of the source driver IC illustrated in FIG. 20.

FIG. 23 is a flowchart of the operation of the source driver IC 121C illustrated in FIG. 20. Referring to FIGS. 1, 20, and 23, in order to compensate for the fan-out of the flat panel display 110, the RC delay of the gate lines formed in the flat panel display 110, and the RC delay of the source lines formed in the flat panel display 110 for each channel in the source driver IC 121C, the resistance of each of resistance compensating circuits connected between the respective channel amplifiers 515-1 through 515-960 and the respective output pads P1 through P960 of the source driver IC 121C is set for each channel in operation S210. The resistance compensating circuits may refer to the resistor arrays 530-1 through 530-960 illustrated in FIG. 20.

The source driver IC 121C may control an output delay for each channel, as illustrated in FIGS. 16C and 16D, using the resistance set for each channel in operation S220. For instance, the source driver IC 121C may compensate for or control the RC delay of each source line (or data line) at each line time.

Although compensation or control of an output delay is performed for each source line (or channel) in the exemplary embodiments illustrated in FIGS. 17 through 21, it may be performed for at least every other source line (or channel) in a source driver IC according to other exemplary embodiments of the inventive concept.

A resistor array having the same structure as the first resistor array 510-1 illustrated in FIG. 18 may be placed between an output terminal of each of the output buffers 317 through 327 and corresponding one of the pads P1 through P12 in other exemplary embodiments.

Each of the resistance control circuits 516-1 through 516-960 illustrated in FIG. 19 may be placed between an output terminal of corresponding one of the output buffers 317 through 327 and corresponding one of the pads P1 through P12 in other exemplary embodiments. A resistor array having the same structure as the first resistor array 530-1 illustrated in FIG. 21 may be placed between an output terminal of each of the output buffers 317 through 327 and corresponding one of the pads P1 through P12 in other exemplary embodiments.

Even when the structure of source drivers which drive a flat panel display needs to be changed since the size and/or fan-out of the flat panel display varies with design or a product model, a designer or manufacturer of the source drivers may replace or change only a metal layer or mask that includes resistance compensating circuits described above with reference to FIGS. 17 through 21 to be suitable to a changed display. Accordingly, even when the size and/or fan-out of a flat panel display (or a curved display) changes, a designer or manufacturer of the source driver IC 121A, 121B, or 121C according to some exemplary embodiments of the inventive concept can quickly and easily design or manufacture a source driver IC suitable to the flat panel display.

It may be construed that a control logic circuit which compensates for (or controls) an output delay with respect to at least one channel (or source line) includes at least one resistance compensating circuit (or output delay control circuit), so that the exemplary embodiments of the inventive concept which have been described above are generally stated.

The source driver IC 121A or 121B described with reference to FIGS. 17 through 19 compensates for or controls both the fan-out of the source driver IC 121A or 121B and the RC delay of at least one gate line formed in the flat panel display 110 and finely tunes the RC delay of each channel even when the RC delay is nonlinear.

The source driver IC 121C described with reference to FIGS. 20 and 21 compensates for or controls all of the fan-out of the source driver IC 121C, the RC delay of at least one gate line formed in the flat panel display 110, and the RC delay of at least one source line formed in the flat panel display 110 and finely tunes the RC delay of each channel even when the RC delay is nonlinear.

As described above, according to some exemplary embodiments of the inventive concept, a source driver IC compensates for a fan-out of a display panel. The source driver IC partially controls output delay times of output signals. The source driver IC compensates for an RC delay of a gate line included in the display panel. The source driver IC eliminates mismatch occurring at a border where a spread step changes. When the source driver IC is used in a display system, a design restriction on a PCB connected to the source driver IC is eliminated.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A source driver for driving a panel display, the source driver comprising:
    a first source driver IC configured to drive a first region of the panel display, wherein the first region includes a first sub-region and a second sub-region; and
    a second source driver IC configured to drive a second region of the panel display, the second region being different from the first region,
    wherein the first source driver IC comprises:
        a first circuit configured to generate first output signals with first output delays for driving first lines in the first sub-region of the panel display; and
        a second circuit configured to generate second output signals with second output delays for driving second lines in the second sub-region of the panel display,
    wherein the first output delays are dependent upon a position of the first lines,
    wherein the second output delays are dependent upon a position of the second lines,
    wherein a difference of output delays between two adjacent output signals among the first output signals and a difference of output delays between two adjacent output signals among the second output signals are different,
    wherein the first circuit is further configured to divide each of input clocks by a first division factor and generate first enable signals involved in the generating of the first output signals,
    wherein the second circuit is further configured to divide each of the input clocks by a second division factor and generate second enable signals involved in the generating of the second output signals, and
    wherein a first output delay between two adjacent signals among the first output signals is determined based on the first division factor, and a second output delay between two adjacent signals among the second output signals is determined based on to the second division factor.

2. The source driver of claim 1, wherein the first circuit is further configured to sequentially output, as the first enable signals, first pulses selected from a first pulse sequence of each of first divided clocks resulting from the dividing of the each of the input clocks by the first division factor; and
    the second circuit is further configured to sequentially output, as the second enable signals, second pulses selected from a second pulse sequence of each of second divided clocks resulting from the dividing of the each of the input clocks by the second division factor.

3. The source driver of claim 2, wherein a first number of the first divided clocks is less than a second number of the first enable signals and a third number of second divided clocks is less than a fourth number of the second enable signals.

4. The source driver of claim 1, wherein the first circuit is further configured to generate in response to a control signal, the first enable signals in a first order in which the input clocks are input or in a second order that is a reverse of the first order.

5. The source driver of claim 4, wherein the second circuit is further configured to generate in response to the control signal, the second enable signals in the first order in which the input clocks are input or in the second order.

6. The source driver of claim 1, wherein a third output delay between a last output signal among the first output signals and a first output signal among the second output signals is different from a second output delay between two adjacent signals among the second output signals.

7. The source driver of claim 1, wherein a third output delay between a last output signal among the first output signals and a first output signal among the second output signals is the same as a first output delay between two adjacent signals among the first output signals.

8. The source driver of claim 1, wherein the first circuit comprises:
    first channel amplifiers configured to amplify first data signals, respectively, to generate the first output signals, respectively;
    first pads connected to the first lines, respectively; and
    first resistor arrays connected, respectively, in between the first channel amplifiers and the first pads, each of the first resistor arrays comprising z first resistors, z being a natural number,
    wherein a number of resistances determined using the z first resistors is greater than 2Z, and a first resistance of each of the first resistor arrays is determined based on a first arrangement of the z first resistors included in each of the first resistor arrays.

9. The source driver of claim 8, wherein the second circuit comprises:
second channel amplifiers configured to amplify second data signals, respectively, to generate the second output signals, respectively;
second pads connected to the second lines, respectively; and
second resistor arrays connected, respectively, in between the second channel amplifiers and the second pads, each of the second resistor arrays comprising z second resistors,
wherein a second resistance of each of the second resistor arrays is determined based on a second arrangement of the z second resistors included in each of the second resistor arrays.

10. The source driver of claim 1, wherein the first circuit comprises:
first channel amplifiers configured to amplify first data signals, respectively, to generate the first output signals, respectively;
first pads connected to the first lines, respectively; and
first resistor arrays connected, respectively, in between the first channel amplifiers and the first pads, each of the first resistor arrays comprising a pair of first metal contacts and a first distance between the pair of first metal contacts, so that one of the pair of first metal contacts is disposed at the first distance from another of the pair of first metal contacts,
wherein first distances between the pair of first metal contacts of the first resistor arrays, are different.

11. The source driver of claim 10, wherein the second circuit comprises:
second channel amplifiers configured to amplify second data signals, respectively, to generate the second output signals, respectively;
second pads connected to the second lines, respectively; and
second resistor arrays connected, respectively, in between the second channel amplifiers and the second pads, each of the second resistor arrays comprising a pair of second metal contacts and a second distance between the pair of second metal contacts, so that one of the pair of second metal contacts is disposed at the second distance from another of the pair of second metal contacts,
wherein second distances between the pair of second metal contacts of the second resistor arrays, are different.

12. A source driver for driving a panel display, the source driver comprising a first source driver IC configured to drive a first region of the panel display, wherein the first region includes a first sub-region and a second sub-region and a second source driver IC configured to drive a second region of the panel display, the second region being different from the first region,
wherein the first source driver IC is configured to:
generate first output signals with first output delays for driving source lines in the first sub-region of the panel display, the source lines in the first sub-region of the panel display including a first source line and a second source line which is adjacent to the first source line, and
generate second output signals with second output delays for driving source lines in the second sub-region of the panel display, the source lines in the second sub-region of the panel display including a third source line and a fourth source line which is adjacent to the third source line,
wherein the first output delays are dependent upon a position of the source lines in the first sub-region of the panel display,
wherein the second output delays are dependent upon a position of the source lines in the second sub-region of the panel display,
wherein a difference of output delays between the first source line and the second source line are different from a difference of output delays between the third source line and the fourth source line,
wherein the source driver further comprises:
a first circuit configured to divide each of input clocks by a first division factor and generate first enable signals involved in the generating of the first output signals; and
a second circuit configured to divide each of the input clocks by a second division factor and generate second enable signals involved in the generating of the second output signals, and
wherein a first output delay between the first output signals is determined based on the first division factor and a second output delay between the second output signals is determined based on the second division factor.

13. The source driver of claim 12, wherein the first circuit is further configured to generate in response to a control signal, the first enable signals in a first order in which the input clocks are input or in a second order that is a reverse of the first order.

14. The source driver of claim 13, wherein the second circuit is further configured to generate in response to the control signal, the second enable signals in the first order in which the input clocks are input or in the second order.

15. The source driver of claim 12, wherein the first circuit is further configured to sequentially output, as the first enable signals, first pulses selected from a first pulse sequence of each of first divided clocks resulting from the dividing of each of the input clocks by the first division factor; and the second circuit is further configured to sequentially output, as the second enable signals, second pulses selected from a second pulse sequence of each of second divided clocks resulting from the dividing of each of the input clocks by the second division factor.

16. A display system comprising:
a flat panel display comprising a first region and a second region, the first region including a first sub-region and a second sub-region, and the second region being different from the first region;
a first source driver integrated circuit (first source driver IC) configured to drive first source lines arranged in the first sub-region and second source lines arranged in the second sub-region; and
a second source driver IC configured to drive source lines arranged in the second region,
wherein the first source driver IC comprises:
a first control logic circuit configured to generate first output signals with first output delays for driving the first source lines; and
a second control logic circuit configured to generate second output signals with second output delays for driving the second source lines,
wherein the first output delays are dependent upon a position of the first source lines,
wherein the second output delays are dependent upon a position of the second source lines, and wherein a difference of output delays between two adjacent output signals among the first output signals and a difference of output delays between two adjacent output signals among the second output signals are different, and wherein the first control logic circuit is further configured to divide each of input clocks by a first division factor and generate first enable signals involved in generation of the first output signals, the second control logic circuit is further configured to divide each of the input clocks by a second division factor and generate second enable signals involved in generation of the second output signals, a first output delay between two adjacent signals among the first output signals is determined based on the first division factor, and a second output delay between two adjacent signals among the second output signals is determined based on the second division factor.

17. The display system of claim 16, wherein the first control logic circuit is further configured to sequentially output, as the first enable signals, first pulses selected from a first pulse sequence of each of first divided clocks resulting from the dividing each of the input clocks by the first division factor; and the second control logic circuit is further configured to sequentially output, as the second enable signals, second pulses selected from a second pulse sequence of each of second divided clocks resulting from the dividing each of the input clocks by the second division factor.

18. The display system of claim 16, wherein the first control logic circuit is further configured to generate in response to a control signal, the first enable signals in a first order in which the input clocks are input or in a second order that is a reverse of the first order.

19. The display system of claim 18, wherein the second control logic circuit is further configured to generate in response to the control signal, the second enable signals in the first order in which the input clocks are input or in the second order.

20. The display system of claim 16, wherein a third output delay between a last output signal among the first output signals and a first output signal among the second output signals, and a second output delay between two adjacent signals among the second output signals and the third output delay are different.

21. The display system of claim 16, wherein a third output delay between a last output signal among the first output signals and a first output signal among the second output signals, and a first output delay between two adjacent signals among the first output signals and the third output delay are the same.

* * * * *